(12) United States Patent
Ishigami et al.

(10) Patent No.: US 6,830,385 B2
(45) Date of Patent: Dec. 14, 2004

(54) PACKAGE HAVING LOCK MECHANISM

(75) Inventors: Yoshiaki Ishigami, Tokyo (JP); Yoshinori Sunaga, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 10/453,675

(22) Filed: Jun. 4, 2003

(65) Prior Publication Data

US 2004/0062493 A1 Apr. 1, 2004

Related U.S. Application Data

(60) Provisional application No. 60/432,022, filed on Dec. 10, 2002.

(30) Foreign Application Priority Data

Sep. 30, 2002 (JP) .......................... 2002-285917
Sep. 30, 2002 (JP) .......................... 2002-285918

(51) Int. Cl.[7] .................................. G02B 6/42
(52) U.S. Cl. ............................. 385/92; 385/53
(58) Field of Search ................................ 385/92

(56) References Cited

U.S. PATENT DOCUMENTS 6,439,918 B1 * 8/2002 Togami et al. ............... 439/372
2003/0171022 A1 * 9/2003 Distad et al. ............... 439/372

* cited by examiner

Primary Examiner—John R. Lee
Assistant Examiner—Phillip A Johnston
(74) Attorney, Agent, or Firm—Foley & Lardner LLP

(57) ABSTRACT

A package having lock mechanism which enable easy lock releasing and easy extraction and insertion of package is provided. A package having lock mechanism, comprising, a package main body provided with a nearly rectangular shaped body portion and a head portion positioned longitudinal front end of said body portion, a lever and a lever turning axis provided beneath bottom of said head portion, said lever is provided so as to make a projection appeared and disappeared in a bottom plane of said body portion, with an acting end which having a projection and is extended to the body portion, and a forcing end existing at front end of said head portion and is located at the opposite side of said acting end relative to said lever turning axis, a crank axis extending to width direction of said package main body along bottom of said head portion, and fitting said forcing end of said lever to a crank portion, an arm which is integrated with said crank axis and is turnable along side plane of said head portion, and a lever prolonging to width direction of said package main body from said arm, when said lever is positioned over the head portion, said projection is exposed out of bottom plane of said body portion, and when said lever is positioned front of said head portion, said projection is accommodated in bottom plane of said body portion.

27 Claims, 15 Drawing Sheets

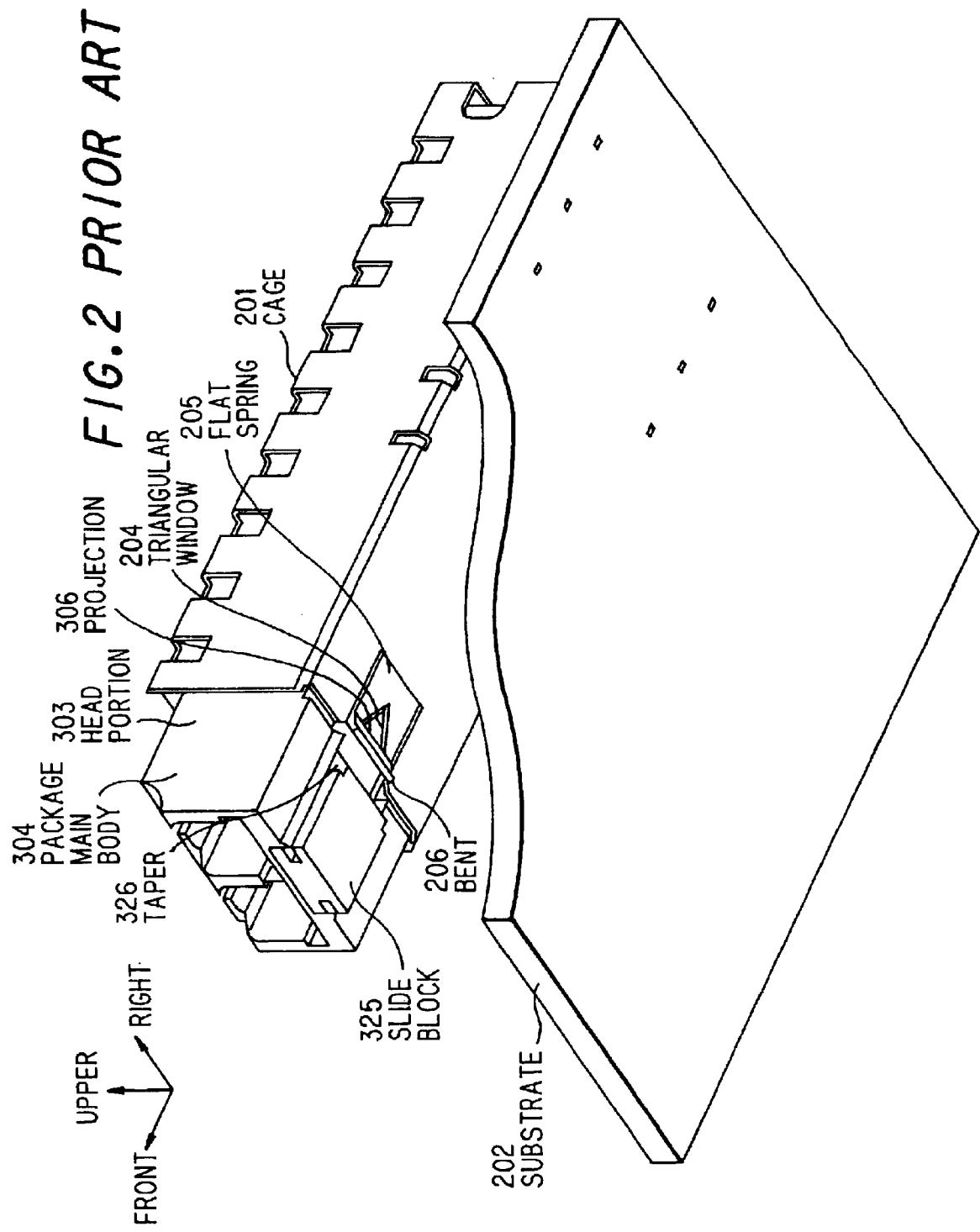

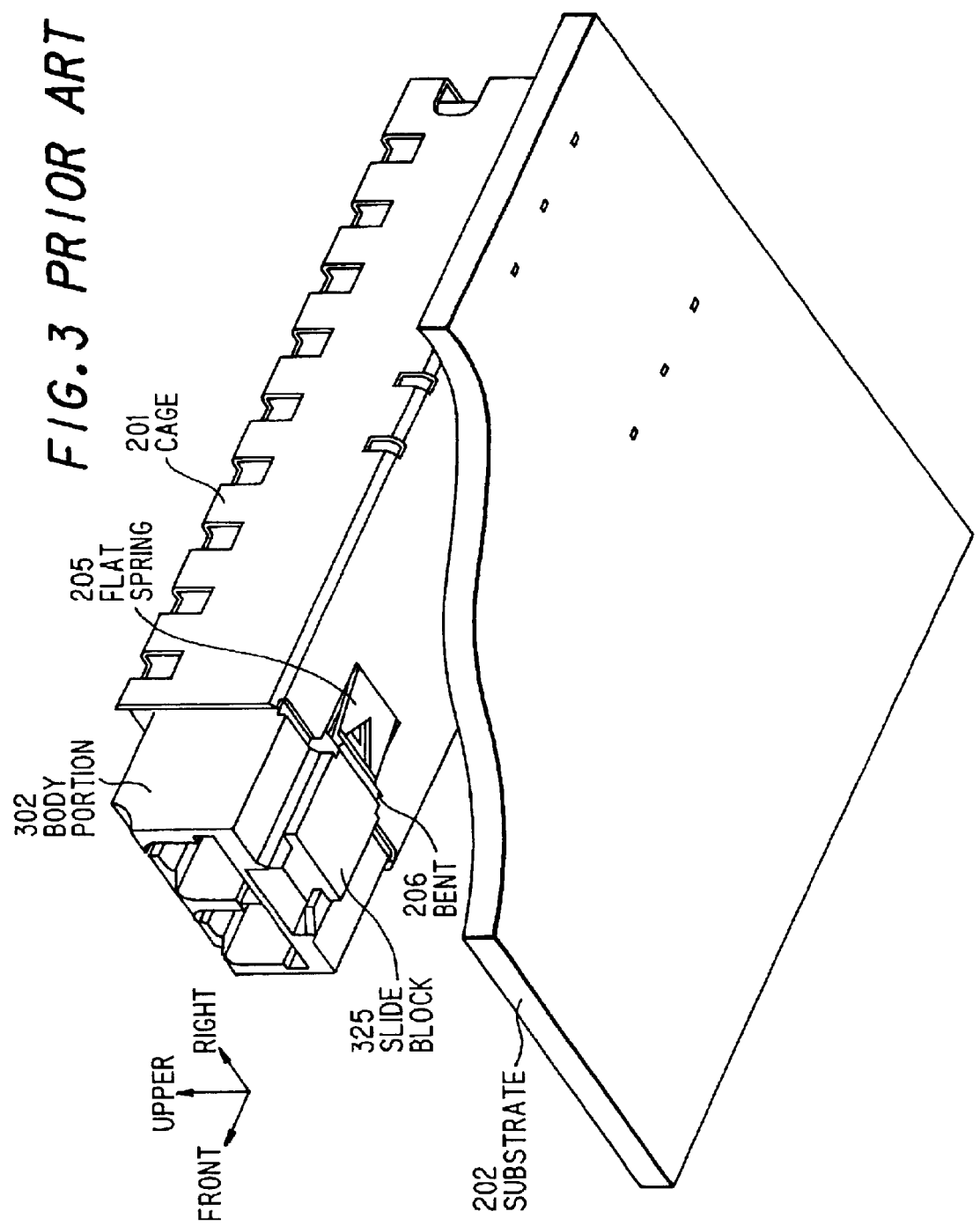

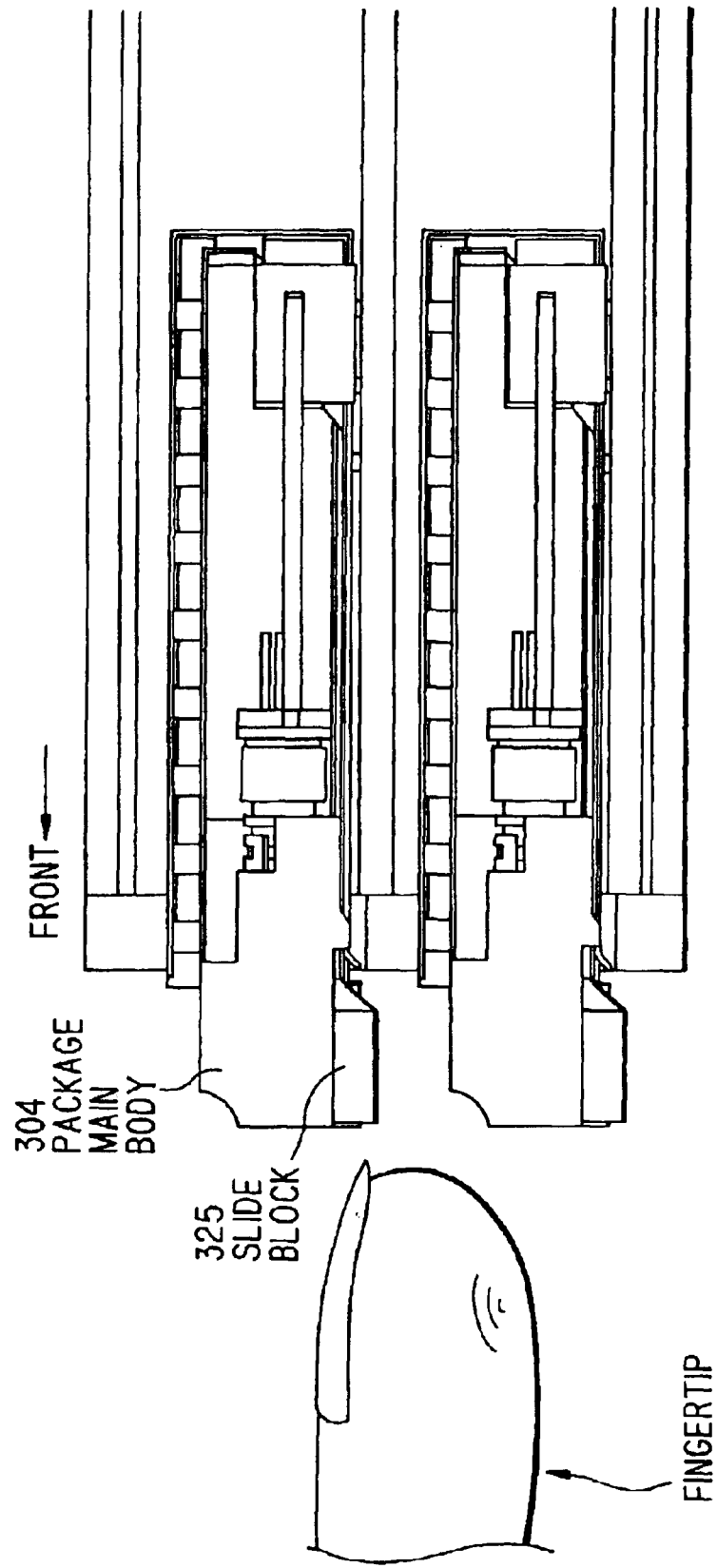

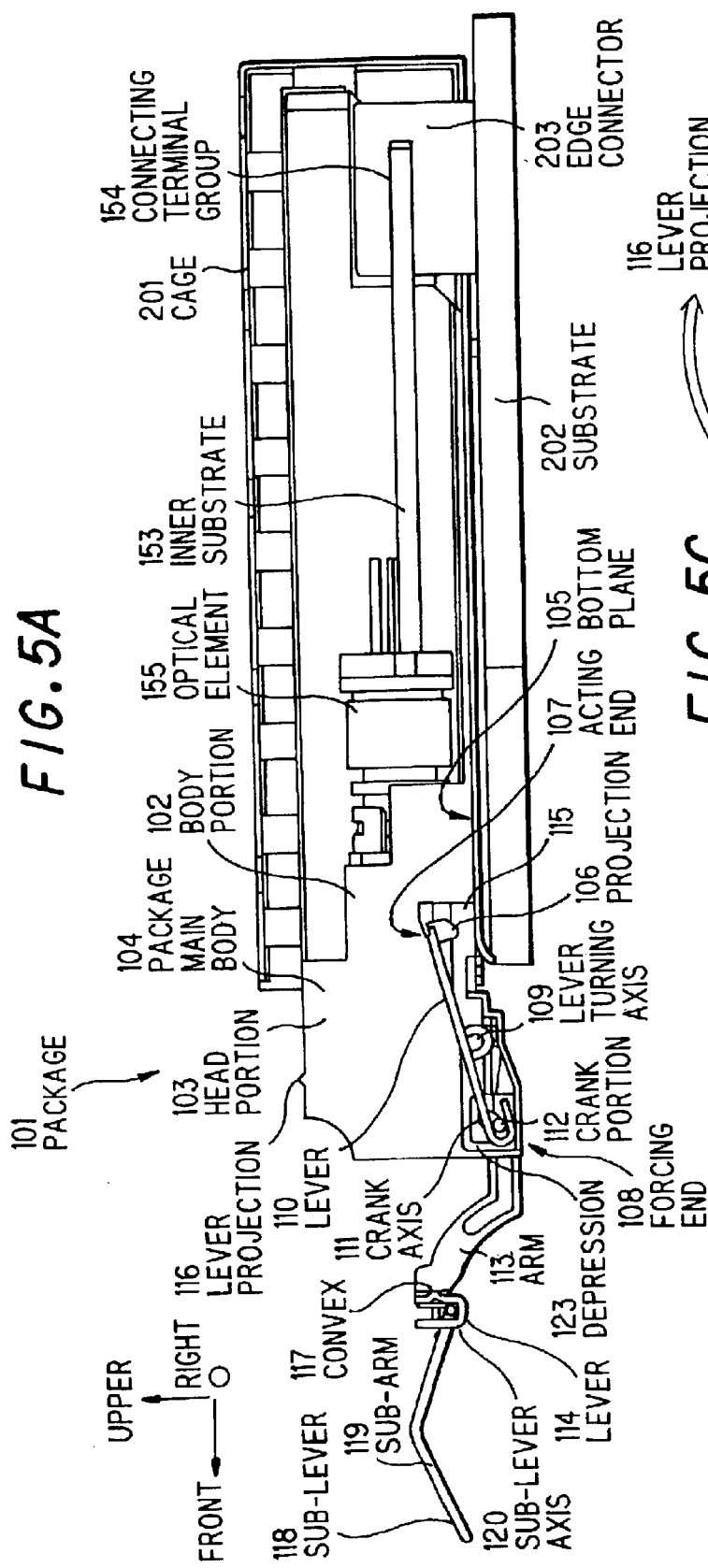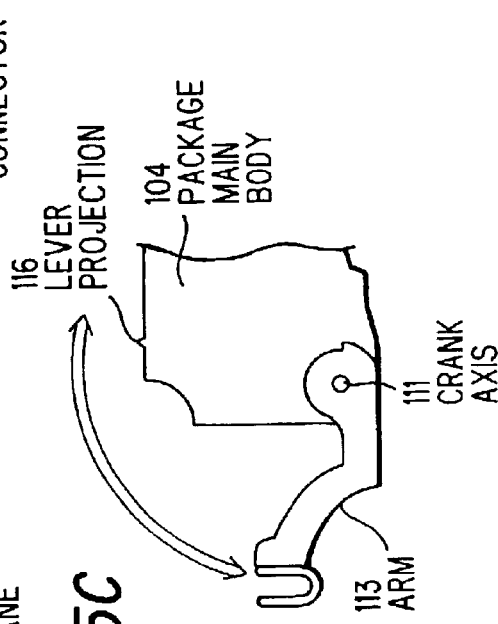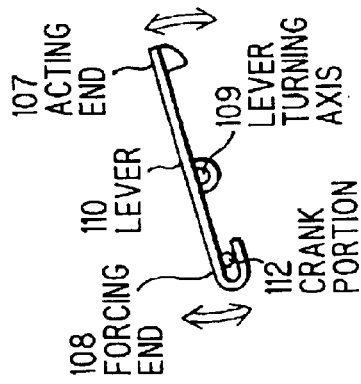

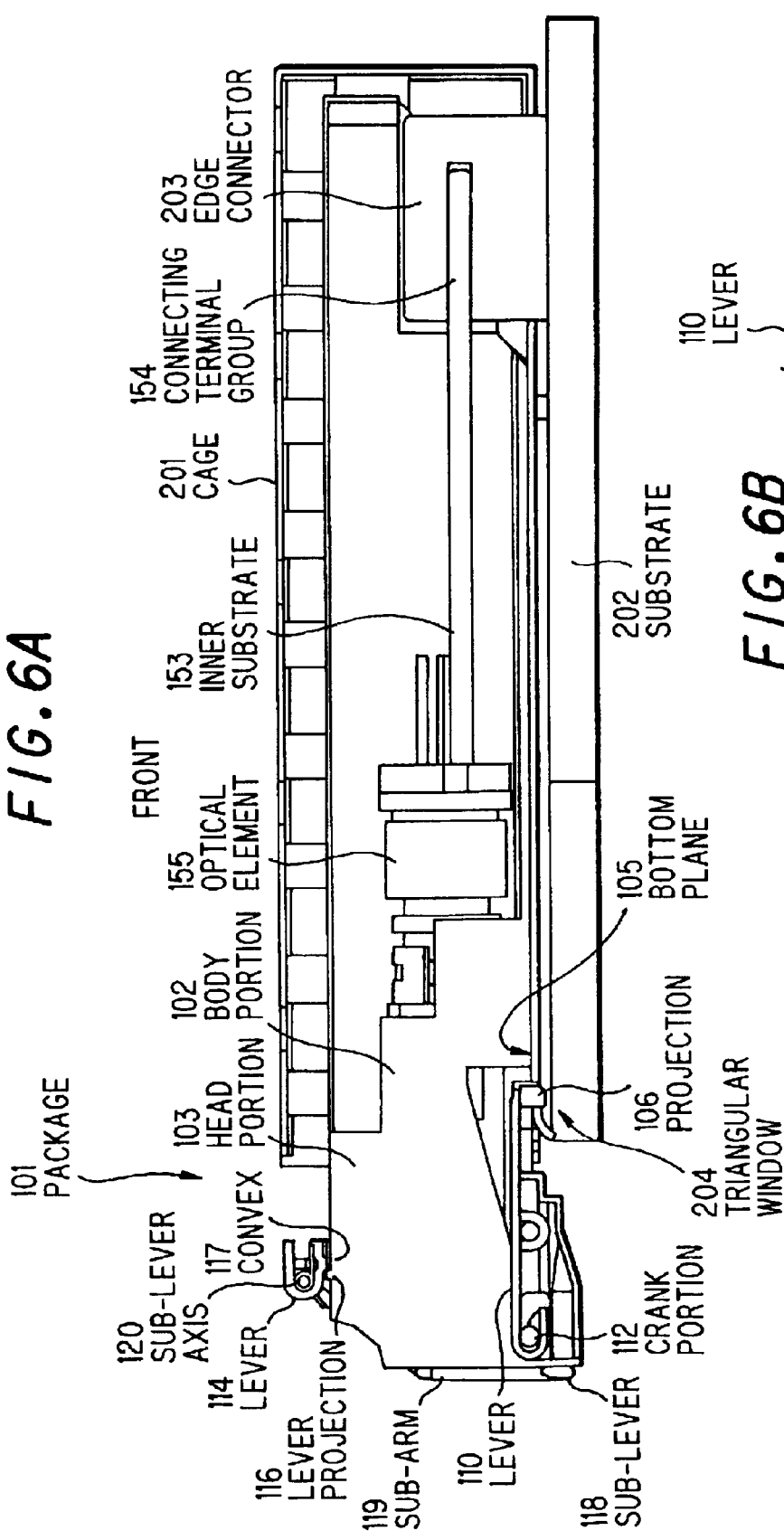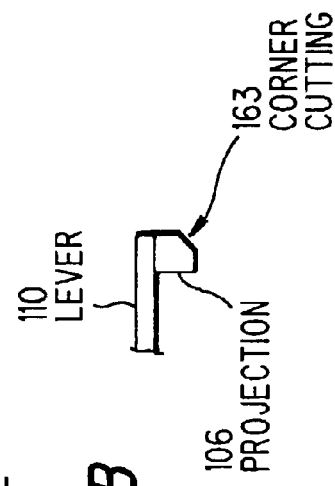

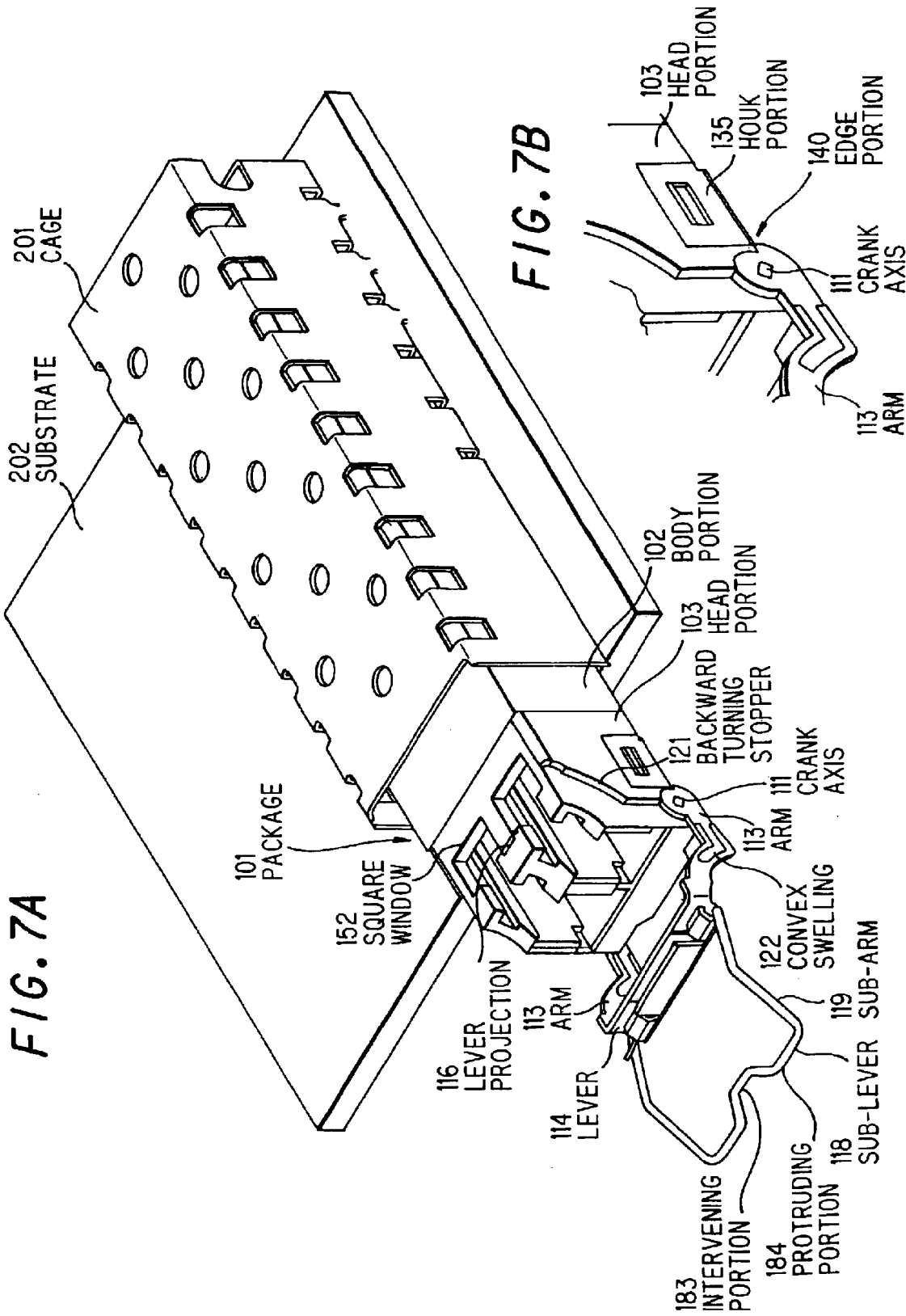

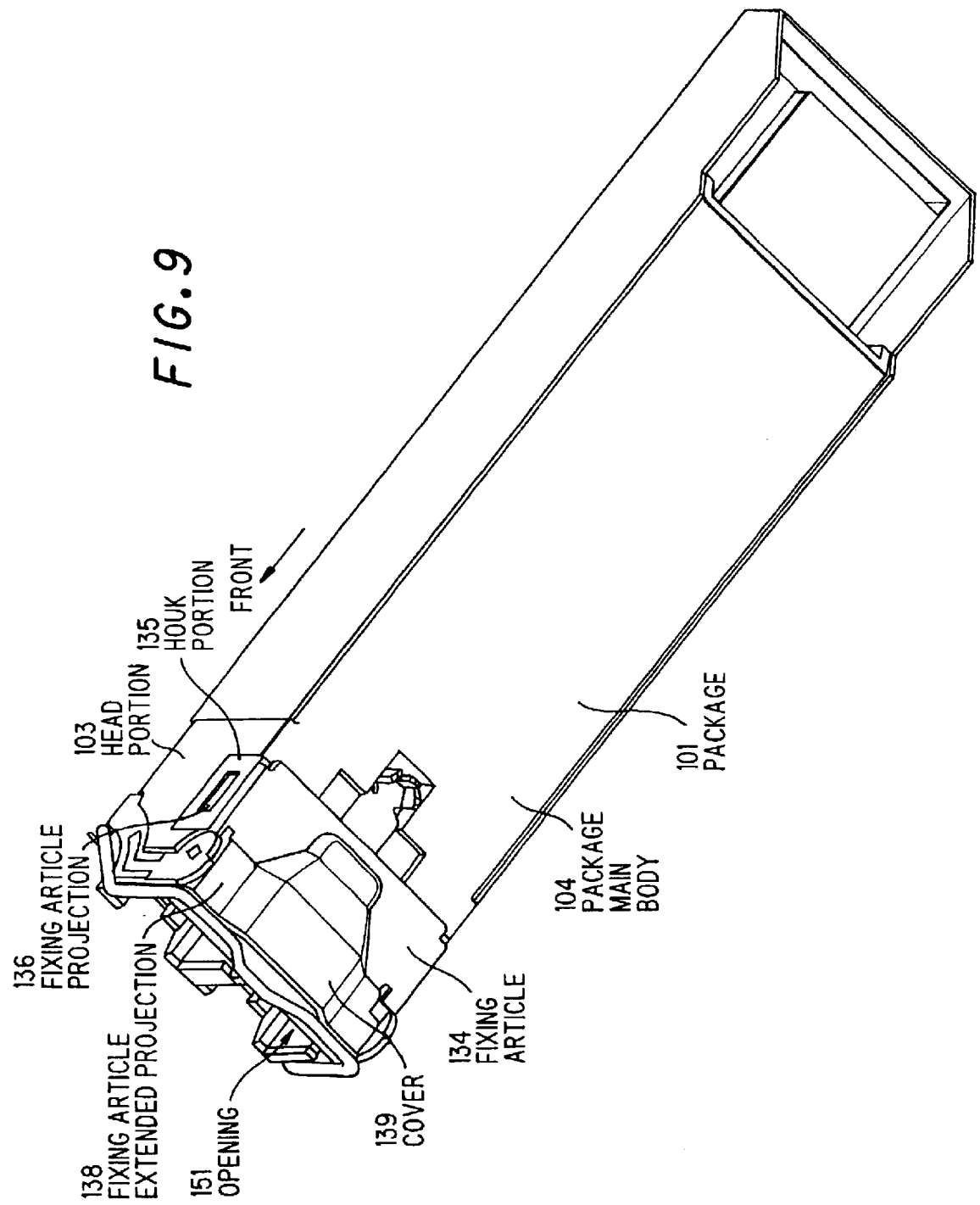

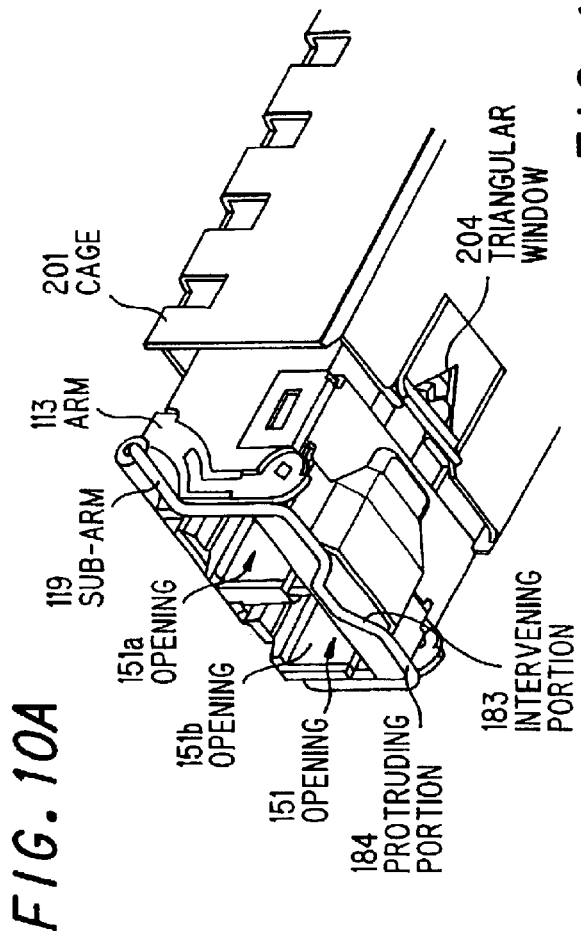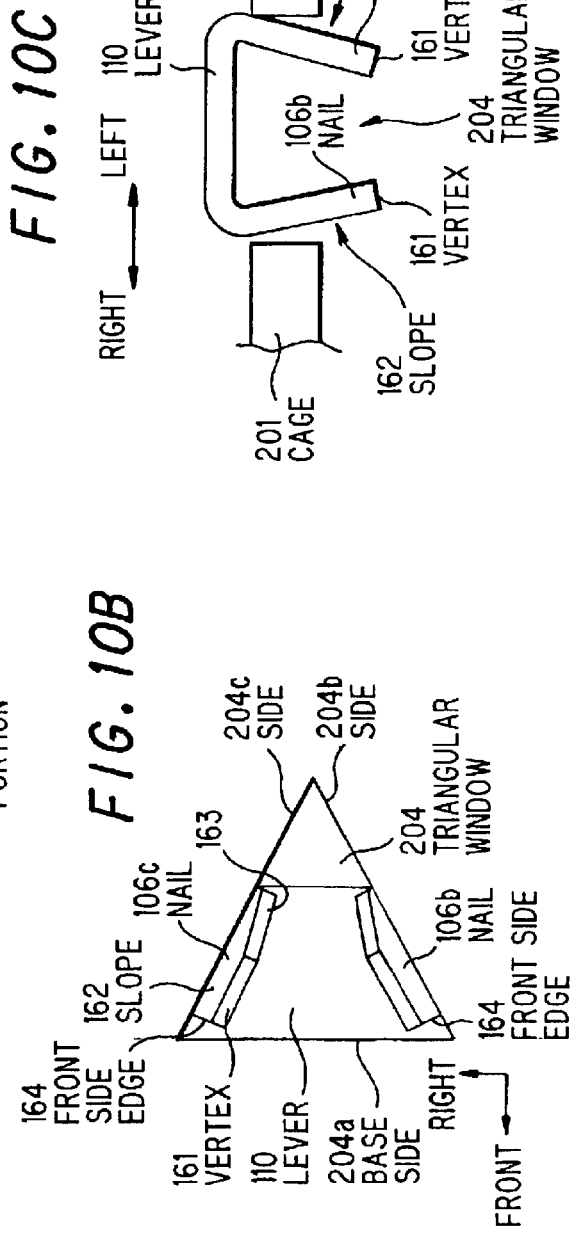

PACKAGE HAVING LOCK MECHANISM

The present application is based on U.S. Provisional Application No. 60/432,022 filed on Dec. 10, 2002, and Japanese Patent Application numbers 2002-285917 and 2002-285918, the entire contents of which are incorporated herein by reference.

BACKGROUND OF THE INVENTION

1. Field of the Invention

The present invention relates to a package such as an optical transmitting and receiving module having lock mechanism which enable exchangeable installment to a substrate, and more specifically to a package having lock mechanism which enable easy lock releasing and easy extraction and insertion of package.

2. Prior Art

In an optical transmitting and receiving module for use in a long distance and high speed optical communication, a transmitting optical element and a receiving optical element are accommodated in one package. Further, in an optical transmitting and receiving module, elements for modulating, amplifying, compensating and stabilizing optical signal and electrical signal are accommodated in the above package too. For connecting between an optical transmitting and receiving module and an optical fiber as an external transmitting line, a receptacle type optical transmitting and receiving module which is constituted to have an opening leading to an optical element to a package and to insert an optical fiber connecter equipped to a terminal of an optical fiber to this opening portion is known.

In a communicating apparatus to which many optical fibers are concentrated, consideration that optional optical fiber connector can be inserted to optional opening by arraying openings of many optical transmitting and receiving modules on a panel is given. So as to put together alignment of optical transmitting and receiving module openings to a panel and simplify inner wirings of a communicating apparatus, it is desirable to install a substrate within a communicating apparatus exposing each opening from each window of a panel by aligning optical transmitting and receiving modules to end of a substrate.

On the other hand, when some failure is occurred to an optical element or an electrical element of an optical transmitting and receiving module, or when adjustment is needed to coincide communicating method (optical wavelength or modulating method) with others, assembly change of an optical transmitting and receiving module is needed. To facilitate assembly change, an optical transmitting and receiving module is provided to a substrate to be mounted and dismounted freely. Namely, a cage is provided on a substrate to maintain mechanically an optical transmitting and receiving module package. A cage is formed in housing shape with its front end being opened, and fixed on a substrate. A package is extracted and inserted from front end of this cage. When a package is inserted to a cage, electrical connection is achieved by forming connecting terminal group at rear end of a package, and disposing corresponding terminal group on a substrate. Accordingly, a package is extracted and inserted from window of a panel, an optical transmitting and receiving module is changed without disassembling a communicating apparatus.

A lock mechanism (female side) to hold a package is provided on a cage, and a lock mechanism (male side) is provided on a package. Because lock mechanism acts when a package is inserted perfectly to a cage (state that contact between connecting terminal group themselves became firmly), disconnecting of package and unstable electrical connecting are prevented. Specifically, a triangular window is opened at bottom of a cage, a projection to be fitted to a triangular window is provided on a package. A projection is provided to be appeared and disappeared inside and outside of bottom of a package. When in the middle of inserting a package to a cage, a projection is disappeared to inside of bottom of package, and when a package is inserted perfectly, a projection is fitted to a triangular window by thrusting out of bottom, and lock mechanism acts. In addition, shape of cage (size or position of a triangular window) is determined according to manufacture's standard.

In above explained optical transmitting and receiving module provided with package having lock mechanism, to make possible extraction and insertion by access from outside of panel of communicating apparatus, lock must be released from front end side of a package.

A conventional package having lock mechanism comprising, as shown in FIG. 1, forming a nearly rectangular shaped body portion 302 and a head portion 303 positioned front end of the body portion 302 by molding, and providing a slide block 325 formed by molding and slidable back and forth at bottom of the head portion 303 of the package main body 304. A cage 201 formed from sheet metal is provided on a substrate 202. As shown in FIG. 2, a triangular window 204 is provided at a position located predetermined distance from open end of bottom of the cage 201. At both sides of the triangular window 204, a flat spring 205 is formed by cutting from open end to backward of the triangular window 204. At front end of the plate spring 205, a slight bent 206 is formed. These FIGS. 1 and 2 are showing a state that the package is inserted perfectly to the cage 201, concerning the package main body 304, the body portion 302 is accommodated wholly in the cage 201, and only the head portion 303 is exposed, further, a projection 306 formed on bottom of the body portion 302 is fitted to the triangular window 204 of the cage 201. Namely, in this state, lock is acting. Further, in this state, front end of the slide block 325 is coinciding with front end of the head portion 303 of the package main body 304, and rear end of the slide block 325 is situating at front of the body portion 302 of the package main body 304. At rear end of the slide block 325, a taper 326 is formed. This taper 326 and front end bent 206 of the plate spring 205 of the cage 201 are facing each other.

As shown in FIG. 3, pushing the slide block 325 to backward, the taper 326 gets into the bent 206 of the plate spring 205, and the plate spring 205 is raised to bottom side. By raising the plate spring 205, the projection 306 passes through inside of the triangular window 204. Then, lock is released, and package is extracted forward easily.

In addition, in FIGS. 2 and 3, to explain for easy understanding, main part of locking mechanism is drawn by emphasizing thickness of the slide block 325 and angle of the bent 206 of the plate spring 205, however, the plate spring 205 and the projection 306 are having practically so small expansion not to touch the substrate 202.

By the way, to put together arrangement of openings in panel, it is desirable to arrange openings multistage up and down, and interval from upper to lower is as short as possible. However, in a conventional package having lock mechanism, there is limitation to shorten interval from upper to lower. As shown in FIG. 4, if interval of upper and lower package is small, interval between the slide block 325 of the upper package and lower package become small. In the Figure, a fingertip is drawn for reference. It becomes difficult to push slide block 325 to lock releasing position by this fingertip. Further, in extracting the package to forward, if interval between top and bottom or right and left is small, it is difficult to hold the head portion of package main body 304 with finger from top and bottom or right and left.

SUMMARY OF THE INVENTION

An object of the present invention is to provide a package having lock mechanism which enable easy lock releasing, and enable easy extraction and insertion of package. Further, an object of the present invention is to provide a package having lock mechanism which enable reliable locking action and easy assembling, improve dimensional accuracy and reduce manufacturing cost.

In accordance with this invention, there is provided a package having lock mechanism, comprising, a package main body provided with a nearly rectangular shaped body portion and a head portion positioned longitudinal front end of said body portion, a lever and a lever turning axis provided beneath bottom of said head portion, said lever is provided so as to make a projection appeared and disappeared in a bottom plane of said body portion, with an acting end which having a projection and is extended to the body portion, and a forcing end existing at front end of said head portion and is located at the opposite side of said acting end relative to said lever turning axis, a crank axis extending to width direction of said package main body along bottom of said head portion, and fitting said forcing end of said lever to a crank portion, an arm which is integrated with said crank axis and is turnable along side plane of said head portion, and a lever prolonging to width direction of said package main body from said arm, when said lever is positioned over the head portion, said projection is exposed out of bottom plane of said body portion, and when said lever is positioned front of said head portion, said projection is accommodated in bottom plane of said body portion.

In accordance with this invention, there is provided a package having lock mechanism, wherein, a concave which is a movement space of said acting end of said lever is provided on bottom of said body portion.

In accordance with this invention, there is provided a package having lock mechanism, wherein, a lever projection which holds said lever is provided on said head portion.

In accordance with this invention, there is provided a package having lock mechanism, wherein, a forward turning stopper which restricts turning of said arm so as to prevent said lever move to lower of said head portion is provided.

In accordance with this invention, there is provided a package having lock mechanism, wherein, a backward turning stopper which restricts turning of said arm so as to prevent said lever move to backward of said head portion is provided.

In accordance with this invention, there is provided a package having lock mechanism, wherein, said arm is provided each side of said head portion and integrated with said lever.

In accordance with this invention, there is provided a package having lock mechanism, wherein, said arm is constituted by processing plate material.

In accordance with this invention, there is provided a package having lock mechanism, wherein, a convex swelling is formed smoothly faced with said head portion on said arm.

In accordance with this invention, there is provided a package having lock mechanism, wherein, a bearing is provided at bottom of said head portion, and a lever crank axis is inserted to said bearing from below.

In accordance with this invention, there is provided a package having lock mechanism, wherein, a forcing end of said lever is fixed to said crank portion by folding back said crank portion.

In accordance with this invention, there is provided a package having lock mechanism, wherein, said head portion is provided with a fixing article which fixes said lever together with said lever turning axis by pressing them to bottom of said head portion, said fixing article is provided with hook portion along both sides of said head portion, and both sides of said head portion are provided with fixing article projection which engages to said hook portion.

In accordance with this invention, there is provided a package having lock mechanism, wherein, said fixing article is provided with a cover which covers below movement space of said forcing end side of said lever.

In accordance with this invention, there is provided a package having lock mechanism, wherein, said fixing article is constituted by processing plate material.

In accordance with this invention, there is provided a package having lock mechanism, wherein, a level difference edge portion which having level difference to radial direction from said crank axis is provided to said arm, and turning of said arm is regulated by intervention of said level difference edge portion to said fixing article.

In accordance with this invention, there is provided a package having lock mechanism, wherein, an opening to which optical fiber connector is inserted is provided on front end of said head portion, an optical element faced with said opening is provided within said body portion, connecting terminal group of said optical element for electric signal is provided at back end of said body portion, and said body portion is inserted to a box cage front end of it is opened and provided on a substrate mounted with electrical signal processing circuit.

In accordance with this invention, there is provided a package having lock mechanism, wherein, a window is provide at predetermined distance apart from said open end of bottom of said cage, said window is triangular window of which base is facing with said open end of said cage and vertex is facing with back end of said cage, and length and position of said lever is determined to engage a projection exposed to outer of bottom surface of said body portion with said triangular window.

In accordance with this invention, there is provided a package having lock mechanism, wherein, said projection is constituted by two nails facing respectively with two different sides of said triangular window.

In accordance with this invention, there is provided a package having lock mechanism, wherein, a slope which closes to center of said triangular window as closer to vertex of said nail is provided to said nail.

In accordance with this invention, there is provided a package having lock mechanism, wherein, said lever prevents insertion of an optical fiber connector when said lever is positioned in front of said head portion.

In accordance with this invention, there is provided a package having lock mechanism, wherein, said opening is two successive opening to which two successive optical connector is inserted, a transmitting optical element is faced with one opening and a receiving optical element is faced with other opening.

In accordance with this invention, there is provided a package having lock mechanism, comprising, a package provided with openings at front end, a lever provided at tip with a projection which appear and disappear from a bottom plane of said package, a crank axis provided with a crank portion to which rear end of said lever is connected, a first arm connected to said crank axis and turn with said crank axis as center of turning, a second arm provided to free end of said first arm with free of fold back toward said first arm, and a sub-lever provided to free end of said second arm.

In accordance with this invention, there is provided a package having lock mechanism, wherein, an acting article which returns free end of said second arm toward said first arm is provided between said second arm and said first arm.

In accordance with this invention, there is provided a package having lock mechanism, wherein, said acting article is comprised of coil spring.

In accordance with this invention, there is provided a package having lock mechanism, wherein, free end of said second arm is positioning near the lower hem of face plane of said package.

In accordance with this invention, there is provided a package having lock mechanism, wherein, said sub-lever is provided with an intervening portion which intervenes with face end of said package and a protruding portion which protrudes below face end of said package.

In accordance with this invention, there is provided a package having lock mechanism, wherein, free end of said first arm is positioning upper of said openings of said package.

In accordance with this invention, there is provided a package having lock mechanism, comprising, a package provided with openings at front end, a lever provide at tip with a projection which appear and disappear from a bottom plane of said package, a crank axis provided with a crank portion to which rear end of said lever is connected, an arm connected to said crank axis and turn with said crank axis as center of turning, a lever provided to free end of said arm, and a foldable joint portion provided to said arm at the middle of said turning axis and said free end.

BRIEF DESCRIPTION OF THE DRAWINGS

The invention will be explained in more detail in conjunction with the appended drawings, wherein:

FIG. 2 is a perspective view showing a conventional package having lock mechanism.

FIG. 3 is a perspective view showing a conventional package having lock mechanism.

FIG. 4 is a cross sectional view showing a communication apparatus using a conventional package having lock mechanism.

FIG. 5(a) is a cross sectional view showing an embodiment of a package having lock mechanism of the present invention.

FIG. 5(b) is an explanatory view showing a movement of a lever.

FIG. 5(c) is an explanatory view showing a movement of an arm.

FIG. 6(a) is a cross sectional view showing an embodiment of a package having lock mechanism of the present invention.

FIG. 6(b) is an explanatory enlarged view showing an acting end of a lever.

FIG. 7(a) is a perspective view showing an embodiment of a package having lock mechanism of the present invention.

FIG. 7(b) is an explanatory enlarged view showing neighbor of a crank axis.

FIG. 9 is a perspective view showing an embodiment after mounting a lock mechanism to a package of the present invention.

FIG. 10(a) is a perspective view showing an embodiment of a package having lock mechanism of the present invention.

FIG. 10(b) is an explanatory enlarged bottom view showing a triangular window.

FIG. 10(c) is an explanatory enlarged cross sectional view showing a triangular window.

DESCRIPTION OF THE PREFERRED EMBODIMENTS

Figure 1:
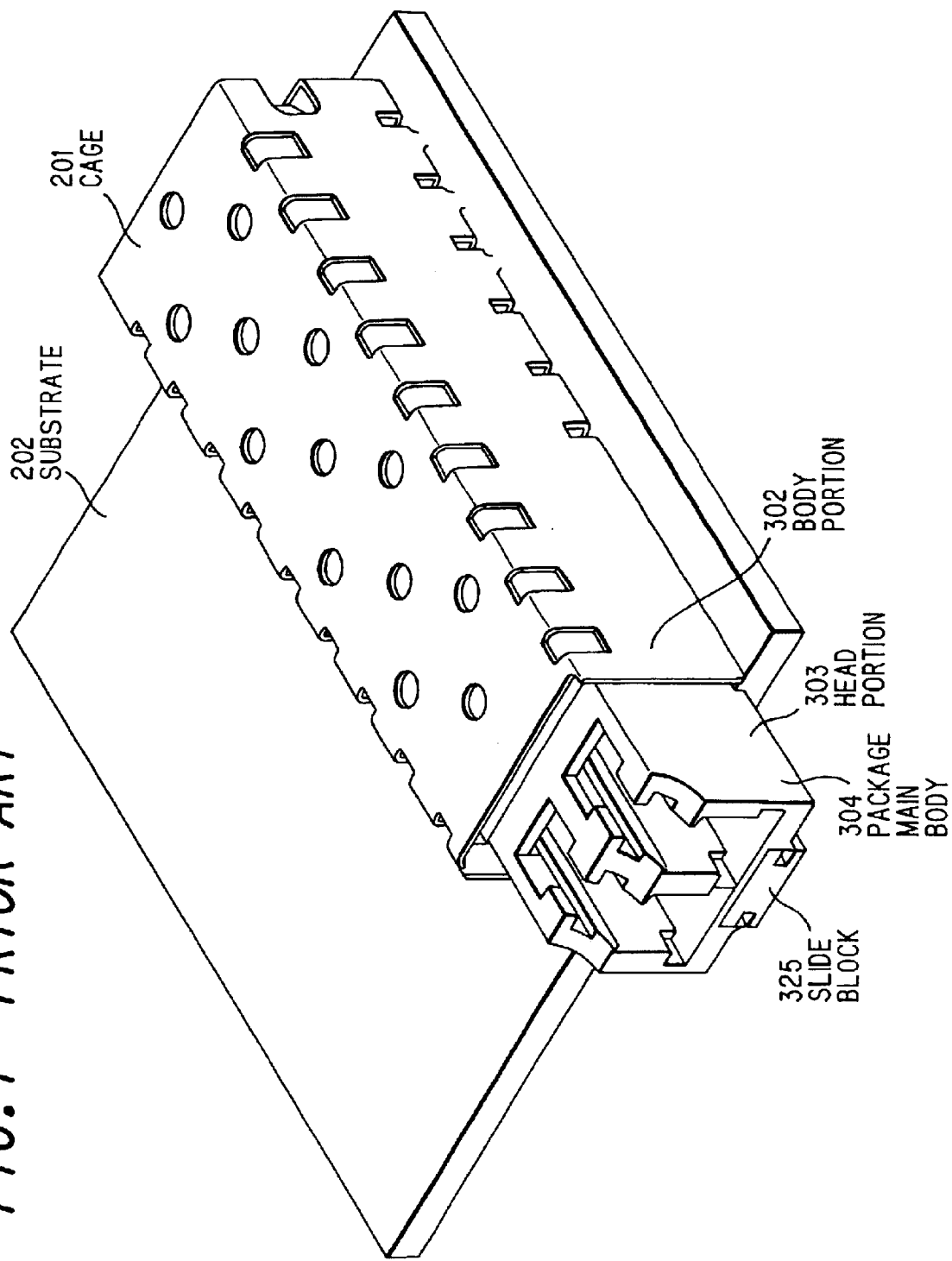
FIG. 1 is a perspective view showing a conventional package having lock mechanism.

Preferred embodiments of the present invention will be explained in conjunction with accompanying drawings.

In FIG. 5(a), the package 101 having lock mechanism of the present invention is shown. The package main body 104 is provided with the nearly rectangular shaped body portion 102 and the head portion 103 positioned longitudinal front end of the body portion. The lever 110 and the lever turning axis 109 are provided beneath the bottom of the head portion 103. The lever 110 is provided with the acting end 107 having the projection 106 is extended to the body portion 102 and the forcing end 108 existing at front end of the head portion 103 is located at the opposite side of the acting end 107 relative to the lever rotating axis 109 so as to make the projection 106 appeared and disappeared in the bottom plane 105 of the body portion 102. The forcing end 108 of the lever 110 is fitted to the crank portion 112 of the crank axis 111 extended to width direction (left and right direction) of the package main body 104 along the bottom of the head portion 103. The arm 113 (first arm) is integrated with the crank axis 111 and is turnable along the side plane of the head portion 103. The lever 114 is prolonged to width direction of the package main body 104 from the arm 113. The projection 106 is exposed out of the bottom plane 105 of the body portion 102 when the lever 114 is positioned over the head portion 103, and the projection 106 is accommodated in the bottom plane 105 of the body portion 102 when the lever 114 is positioned front of head portion 103.

The arm 113 is provided on each side of the package main body 104. The crank axis 111 is connected to the each arm 113 through axis hole. Beneath the bottom plane of the head potion 103 of the package main body 104, U shaped groove or half round groove is formed (refer to FIG. 8). The crank portion 112 is formed by rising the center portion of axis direction of the crank axis 111 to radial direction. Beneath the bottom plane of the head portion 103, the concave 123 which is the movement space of the forcing end 108 of the crank portion 112 and the lever 110 is formed. The lever 114 is connected to the each arm 113 provided both right and left sides. The lever 114 and the arm 113 are made possible to rotate around the crank axis 111 as a center. The crank portion 112 changes its rotation angle position according to rotating movement of the crank axis 111, and the forcing end 108 of the lever 110 fixed to the crank portion 112 moves up and down. Beneath the bottom plane of the head portion 103 of the package main body 104, U shaped groove or half round groove which serves as a bearing 131 of the lever rotating axis 109 (refer to FIG. 8) is formed. The lever rotating axis 109 is provided on the lever 110 and it acts as a fulcrum for leverage. Therefore, up and down motion of the acting end 107 and the forcing end 108 is opposite direction each other. In FIG. 5(b) rotating direction and estimated movement range of the acting end 107 and the forcing end 108 of the lever 110 are shown by arrows, and in FIG. 5(c) rotating direction and estimated movement range of the arm 113 and the lever 114 are shown by an arrow.

Beneath the bottom of the body portion 112, the concave 115 which is the movement space of the acting end 107 of the lever 110 is formed. Over the head portion 103, the lever projection 116 which holds the lever 114 is formed. On the lever 114, the convex 117 which engages with the lever projection 116 is formed.

FIG. 5(a) shows a state that the lever 114 is positioning in front of the head portion 103. Then, the crank portion 112 is positioning somewhat beneath of the crank axis 111, the acting end 107 of the lever 110 is held in the deepest position of the concave 115, the projection 106 is wholly held in inner the bottom plane 105 of the body portion 102 (upper the bottom plane 105 in the Figure) Though the lock mechanism (female side) of the cage will be explained later, at least as a lock mechanism (male side) of a package, lock is released at this state.

FIG. 6(a) shows a state that the lever 114 is positioning over the head portion 103. Since the Figure is showing cross sectional view, the arm 113 is not shown in the Figure, the arm 113 is standing along both side (left and right) planes of the head portion 103 in this state. Then, the crank portion 112 is positioning somewhat upper of the crank axis 111 (not shown in FIG. 6(a)), the lever 110 is almost parallel to the bottom plane 105 of the body portion 102, the projection 106 is exposed fully outward from the bottom plane 105 of the body portion 102. At least as a rock mechanism of a package, lock is acted at this state.

Numeral 118 denotes a sub-lever and numeral 119 denotes a sub-arm. The sub-lever 118 and the sub-arm 119 rotate around the sub-lever axis 120 held in the lever 114. The sub-lever 118 provided to the free end of the sub-arm 119 is positioning at the front of the lever 114 in FIG. 5(a), and positioning near the lower hem of the end face of the head portion 103 in FIG. 6(a). In this embodiment, the lever 114 comprising plate material and the sub-lever 118, the sub-arm 119 and the sub-lever axis 120 comprising a series of round bar material. The sub-lever 120 is held by a part of the turned up lever 114.

Figure 13:
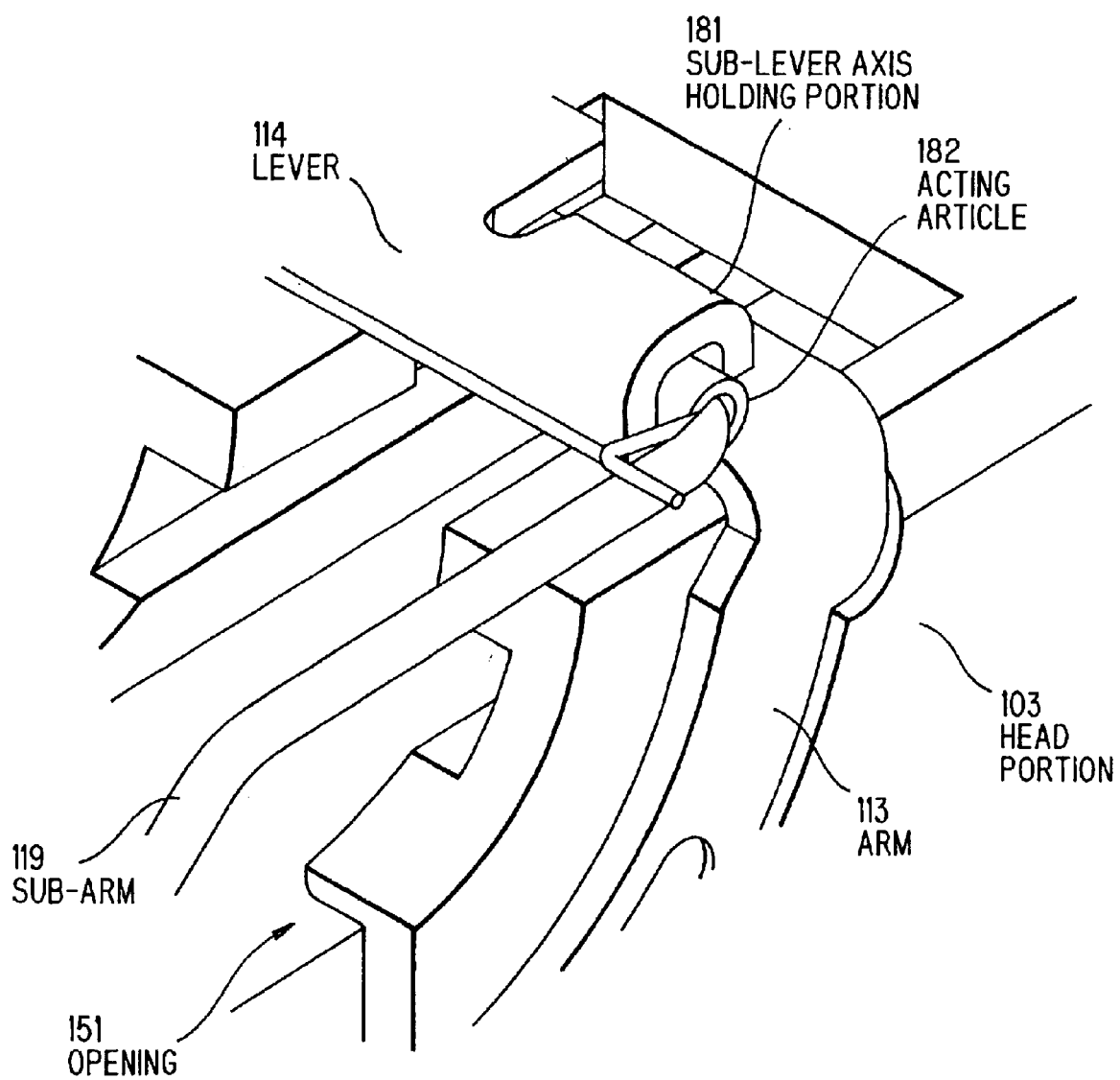
FIG. 13 is an explanatory enlarged perspective view showing an embodiment of neighbor of a lever of a package having lock mechanism of the present invention.
Figure 14:
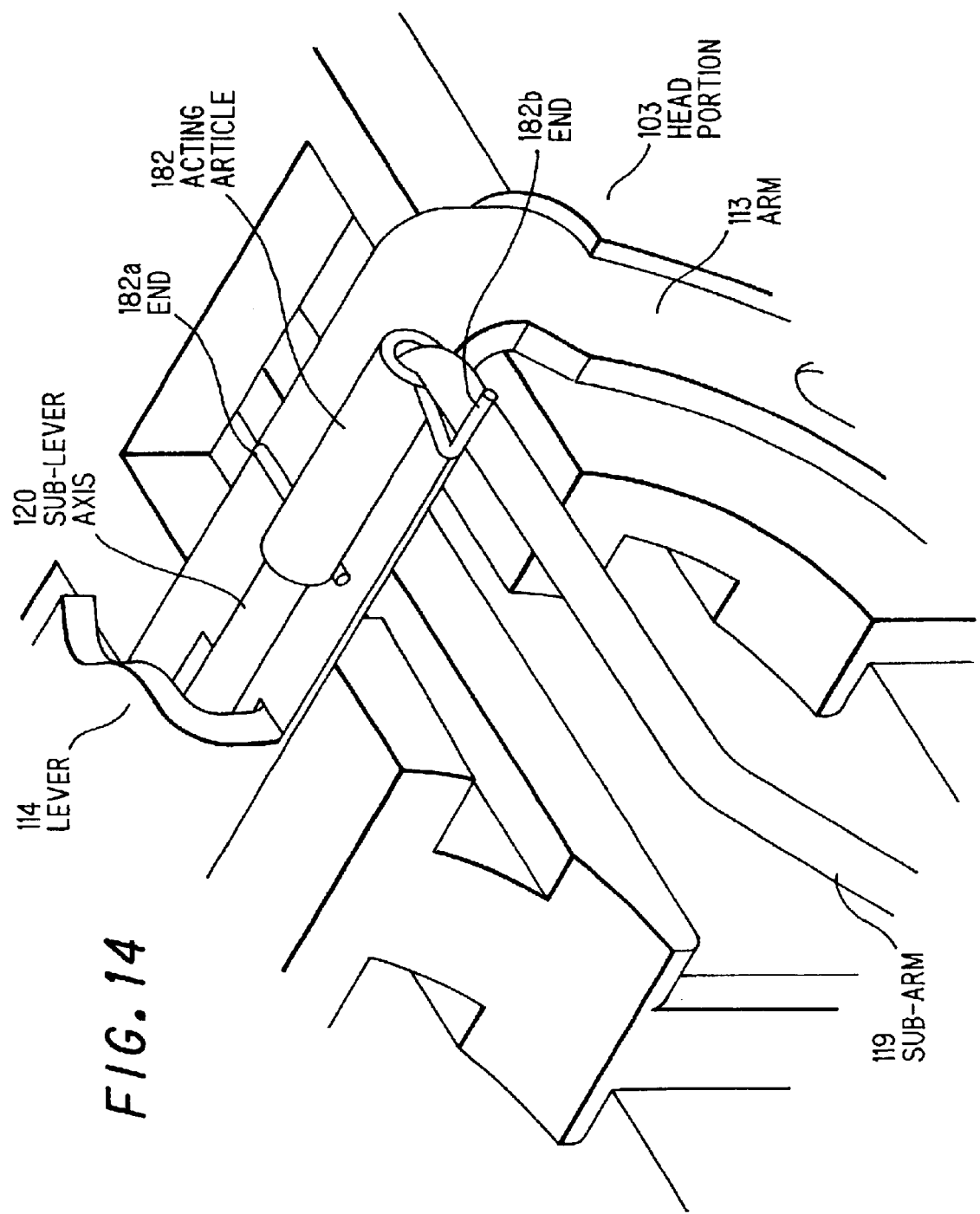
FIG. 14 is an explanatory partial cut off view of FIG. 13.

FIG. 13 shows an extended view neighbor of the lever 114, and FIG. 14 shows a partial cut view of the lever 114 at the same portion as FIG. 13. As shown in these Figures, the arm 113 is extending upper oblique and rear direction from the front end of the head portion 103 along side plane of the head portion 103. The lever 114 is extending straightly from the right side plane to the left side plane of the head portion 103. The right side end and the left side end of the lever 114 are providing a sub-lever axis holding portion 181 which holds the sub-lever axis 120.

Figure 8:
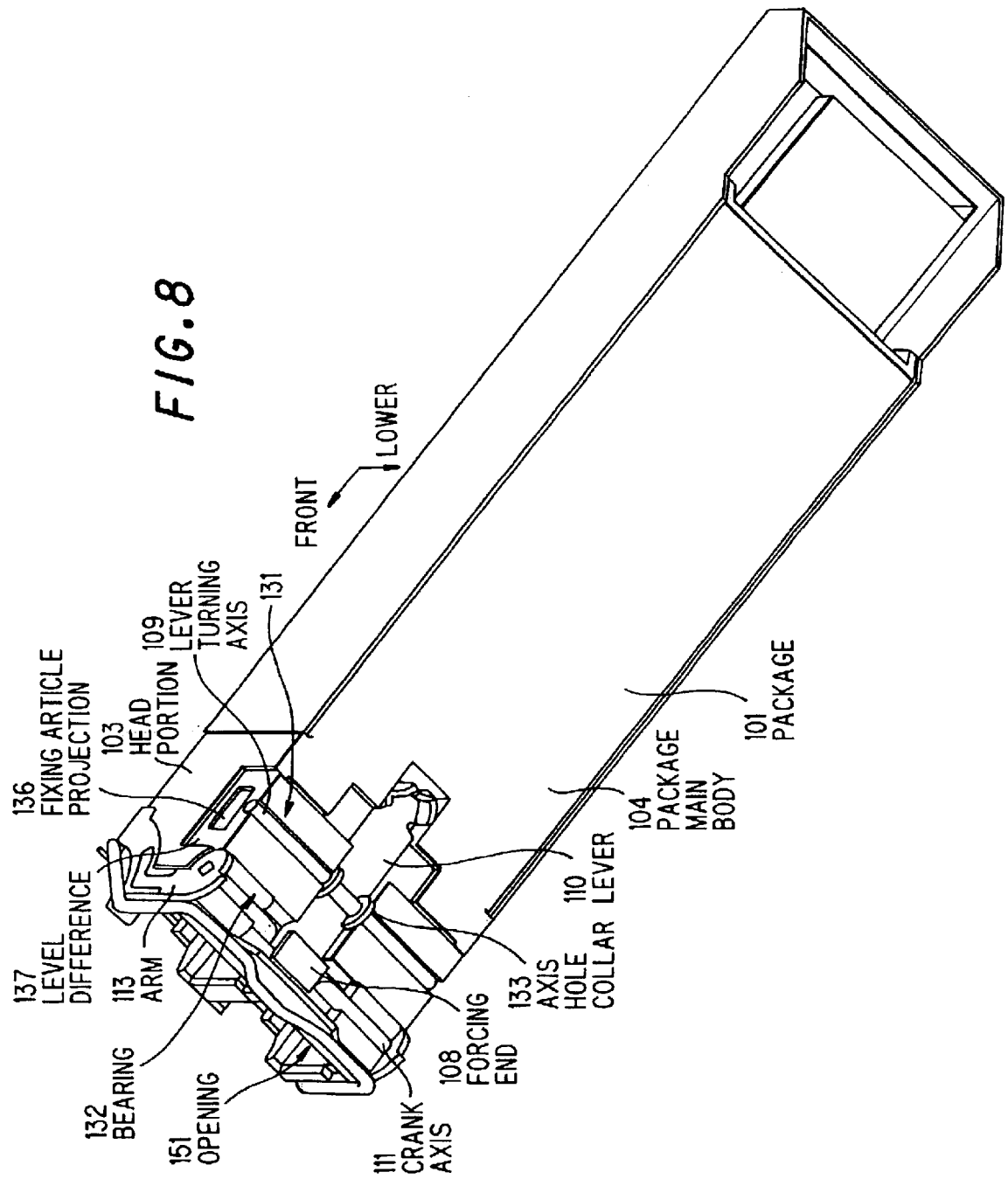
FIG. 8 is a perspective view showing an embodiment of a process of mounting a lock mechanism to a package of the present invention.

Between the sub-arm 119 and the lever 114 (arm 113), the acting article 182 which returns free end of the sub-arm 119 to front end of the head portion 103 by acting the sub-arm 119 to the arm 113 direction is provided. In this embodiment, the acting article 182 comprising coil spring is provided in the sub-lever axis holding portion. The sub-lever axis 120 is provided through the hole of the acting article 182. The acting article 182 is acting the sub-arm 119 to the arm 113 direction by contacting the one end 182a on the lever 114 and the other end 182b to the sub-arm 119. Accordingly, so long as external force is not given, sub-arm 119 is contacting and closing to the arm 113 as shown in FIGS. 8, 9 and 10. Even if the acting article 182 is not provided, the sub-arm 119 returns to the state shown in FIGS. 8 to 10 by hanging down with dead weight, positive return is achieved by the acting article 182.

In addition, the acting article 182 is not limited to a coil spring, but a plate spring may be applicable. Further, giving elasticity to a series of round bar substance connecting to the sub-lever 118, this round bar substance may apply to the acting article 182.

Even if the sub-lever 118 is not provided or the sub-arm 119 is not provided both sides of the head portion 103, the sub-arm 119 may be used as a substance which moves the lever 114 to front direction. In this case, the free end of the sub-arm 119 need not reach to the bottom side of the end plane of the head portion 103. Namely, so long as the free end of the sub-arm 119 reaches near the winding portion in the middle of the arm 113, it is possible to raise up with fingertip. However, in the embodiment, to increase durability, the loop is formed by the sub-lever 118, the left and right sub-arms 119 and sub-lever axis 120, and to avoid rotation of the sub-lever axis 120 or the crank axis 111 with cantilever, the sub-lever 118 is provided. When the sub-lever 118 is provided, in order that the sub-lever 118 does not cross the center of the end plane of the head portion 103, the free end of the sub-arm 119 is extended to the bottom side of the front end of the head portion 103. According to this, the sub-lever 118 is positioned at the bottom side of the end plane of the head portion 103.

The sub-lever 118 is provided with the intervening portion 183 which intervenes with the front end plane of the head portion 103, and the protruding portion 184 which protruding below the front end of the head portion 103 (refer to FIG. 7(a)). As explained above, it is desirable that the sub-lever 118 is positioned at the bottom side of the end plane of the head portion 103, however, since the sub-arm 119 is acted to the arm 113 direction, if the sub-lever 119 protrudes wholly below the front end of the head portion 103, the rotation of the sub-arm 119 becomes not to be limited, therefore, the sub-lever 118 is moved to the rear of the front end of the head portion. Then, it becomes difficult to pull out the sub-lever 118 using fingertip. On the other hand, if the sub-lever 118 intervenes wholly to the front end of the head portion 103, the rotation of the sub-arm 119 is limited, and the sub-lever 118 is stopped contacting with the front end plane of the head portion 103. Then, to pull out the sub-lever 118, it must be torn off from the front end plane of the head portion by sticking the claws. Namely, there is inconvenience in each case when the sub-lever 118 protrudes wholly below the front end of the head portion 103, or when the sub-lever 118 intervenes wholly to the front end of the head portion 103. Accordingly, in the present invention, the sub-lever 118 is provided with the intervening portion 183 and the protruding portion 184. Therefore, since the sub-lever 118 is not moved to the rear of the face end of the head portion, and the protruding portion 184 is protruding below the front end of the head portion 103, it is possible to raise up the sub-lever easily by touching with fingertip.

FIG. 7(a) is a perspective view of the package 101 having lock mechanism viewed from upper right, it will be helpful to understand FIG. 5(a) and FIG. 6(a).

In addition, in this embodiment, though a pair of sub-arms (second arm) 119 are provided at the free end of a pair of arms (first arm) 113, and the sub-lever 118 is provided extend over a pair of these sub-arms, it is possible to form a folding joint portion in the middle of the rotating axis and the free end of the arm, by providing a pair of arms which pivots on the crank axis 111, and a lever extend over these arms. By folding the arm in two at the joint portion, the same behavior as folding the arm 113 and the sub-arm 119 is performed without the sub-lever 120.

Operations of transition from FIG. 6(a) state to FIG. 5(a) state, and from FIG. 5(a) state to FIG. 6(a) state will be explained as follows. In FIG. 6(a) state, since the lever 114 is fixed by the lever projection 116, even if vibration and shock are applied, the lever 114 does not move to the front direction of the head portion 103. Accordingly, lock state in which the projection 106 is exposed to outside of the bottom plane 105 of the body portion 102 is maintained. The sub-arm 119 is closing to contact to the side substance 113.

Now that, putting a fingertip on the lever 114 and pulling forward, the lever 114 gets over the lever projection 116 and becomes free. When the sub-lever 118 is utilized, hanging a fingertip on the sub-lever 118 and pulling forward, the sub-lever 118 is turned and move to the front direction of the head portion 103. Further, pulling the sub-lever 118 forward, the lever 114 gets over the lever projection 116 and becomes free. In this state, pulling the lever 114 or the sub-lever 118 forward, the arm 113 is turned to get to the lock release state shown in FIG. 5(a).

As explained above, lock is released by merely accessing a fingertip from the front. This method is easy comparing with a conventional method which pushes the slide block into the lock release position. Further, since the lever 114 and the sub-lever 118 are jump out to the front direction of the head portion 103 in the sate that lock is released, a package can be extracted forward by pulling the lever 114 or the sub-lever 118 to forward more. Therefore, it becomes needless to pick a package with a finger as before, a package can be extracted in a narrow space. Further more, in conventional, since lock is achieved by utilizing restoring force of the plate spring 205 of the cage, if the restoring force is weakened by aging or handling mistake, the fitting between the projection 306 and the triangular window 204 becomes unreliable. In the present invention, utilizing appearance and disappearance of the projection 106 and not utilizing the plate spring 205, deterioration of plate spring does not occur and not influenced by deterioration.

When the lever 114 is pushed to backward by a fingertip from the state of FIG. 5(a), or pushed to backward by picking the sub-lever 118, the lever 114 moves to upper of the head portion 103, and gets over the lever projection 116. Since the lever 114 is latched, it does not be moved by releasing a fingertip. The sub-lever 118 returns spontaneously to the position shown in FIG. 6(a) by the action of the acting article 182.

As explained above, basic concepts of the present invention would be understood. The present invention will be explained more detail as follows.

As shown in FIG. 7(a) and FIG. 7(b), the package 101 having lock mechanism of the present invention is provided with the backward turning stopper 121 which restricts turning of the arm 113 so as to prevent the lever 114 move to backward of the head portion 103. The backward turning stopper 121 is provided by forming a level difference on a side plane of the head portion 103. This level difference is formed by narrowing at front and slight widening at backward the width of the package 101 so as to contact the lever 114 with the rear end edge of the arm 113 in the state that the lever 114 is fixed by the lever projection 116 at upper of the head portion 103. According to this, since turning of the arm 113 is restricted, the lever 114 cannot move to backward more than the position shown in FIG. 7(a), rattle of the lock mechanism is prevented and useless force does not apply to the joint portion of the crank axis and to the crank portion 112.

As stated above, the each arm 113 is provided both left and right sides of the head portion 103. As understood from the basic concepts of the present invention, even if the arm 113 is provided to either side, the lock mechanism may be carried out. However, durability and reliability of operation is increased by integrating two arms 113, 113 with the lever 114. Further, instead of manufacturing the two arms 113, 113 and the lever 114 separately each other, and assembling them, it becomes possible to manufacture by integrated forming from a single material, manufacturing becomes easy. If the crank axis 111 is inserted to the each arm 113 and they are joined, the arms 113, 113, lever 114 and crank axis 111 constitute closed integrated frame, durability increases further.

It is preferable that the arm 113 is constituted by processing plate material such as metal plate. Namely, in an utilization form that the head portion 103 is exposed from the window of the panel, it is preferable that projections of article to left and right sides of the head portion 103 is as small as possible. When the arm 113 is constituted by a palate material, the projection is made smaller comparing with the arm 113 is constituted by a round bar. Together with the level difference as the backward turning stopper 121 is provided on a side plane of the head portion 103, the arm 113 comprising a metal plate become the same plane as the side plane of the head portion 103, a projection to width direction is not appeared. Further, a metal plate is processed by pressing, size accuracy and productivity are improved comparing with bend processing of a round bar. Furthermore, above explained integrated forming of the two arms 113, 113 and the lever 114 is processed easily by pressing.

It is preferable that the arm 113 is provided with a convex swelling 122 formed smoothly faced with the head portion 103 and at the middle of the front end edge and the rear end edge. In FIG. 7(a), the swelling 122 is emphasized by drawing clearly the edge of the swelling, practically the swelling 122 is swelling smoothly and having no squarish, since the swelling 122 contacts with the side plane of the head portion 103, the front end edge and the backward end edge of the arm 113 estrange slightly from the head portion 103. Accordingly, when the arm 113 turns along the head portion 103, the package main body 104 is not damaged by the ridge of the front end edge or the backward end edge. If the package main body 104 is formed by resin molding, failures which prevent optical coupling or electrical conductivity are suspected to be caused in surroundings by scattering of resin powder produced by the damage. If the package main body 104 is formed by metal diecasting, failures which prevent optical coupling or generate electrical short circuit are suspected to be caused in surroundings by scattering of resin powder produced by the damage. The swelling 122 is effective to prevent these failures, and also effective to increase mechanical strength of the arm 113.

Next, constitutions to provide the package main body 104 with articles of lock mechanism will be explained.

As shown in FIG. 8, the package 101 having lock mechanism of the present invention is provided with the bearing 131 at the bottom portion of the head portion 103 of the package main body 104. Since this bearing 131 comprising U shaped groove or half round groove and downward being opened, the lever turning axis 109 is inserted from downward.

At the bottom portion of the head portion 103, another bearing 132 is provided parallel to the bearing 131. Since this bearing 132 comprising U shaped groove or half round groove and downward being opened, the lever crank axis 111 is inserted from below.

The lever turning axis 109 is provided to the lever 110 formed by processing a metal plate. Namely, the lever turning axis 109 is jointed by inserting through the axis hole collar 133 formed by bending from both sides of the lever 110.

The forcing end 108 of the lever 110 is fixed to the crank portion 112 by turning back the end of the lever 110 and holding the crank portion 112 (refer to FIG. 5(*a*) and FIG. 5(*b*)). According to this, connection between the crank axis 111 and the lever 110 is achieved. The crank portion 112 is provided to be "U" shape or "C" shape so as to be connected easily with the plate state lever 110 by paralleling with the crank axis 111.

As explained above, since the lever turning axis 109 is provided on the lever 110, the crank portion 112 is connected to the lever 110, and as explained above, the crank axis 111, the left and right arms 113, 113, and the lever 114 are integrated, after all, the movable article group of the lock mechanism is linked together. Accordingly, in assembling the package, after turning up the bottom shown in FIG. 8 by turning over the package main body 104, the lever turning axis 109 is inserted to the bearing 131 and the crank axis 111 is inserted to the bearing 132 by bringing down the linked movable article group from upper (from lower in the Figure). Like this, the assembling is performed easily. The assembling is completed by fixing the linked movable article group with the fixing article.

As shown in FIG. 9, the head portion 103 of the package main body 104 is provided with the fixing article 134. The fixing article 134 is to fix the lever 110 shown in FIG. 8 by pressing together with the lever turning axis 109 to the bottom of the head portion 103. Specifically, the fixing article 134 is preventing drop of the lever turning axis 109 by covering the bearing 131. Accordingly, the lever turning axis 109 is held in the bearing 131, and the lever 110 integrated with the lever turning axis 109 is also held in the depression 123 and the depression 115.

The fixing article 134 is provided with the hook portion 135 along both sides of the head portion 103. The hook portion 135 is formed by making a hole through plate substrate. The opposing package main body 104 is at both sides of the head portion 103 provided with the fixing article projection 136 which engages to the hook portion 135. The fixing article projection 136 is not projected from the side plane of the head portion 103, but is raised relatively by forming the level difference 137 which embeds the hook portion 135 to the side plane of the head portion 103. The fixing article 134 is fixed to the package main body 104 by fitting the hook portion 135 to the fixing article projection 136.

The fixing article 134 is extended to neighbor of the front end of the head portion 103. This fixing article extended portion 138 is regulating dropping of crank axis 111 by covering the bearing 132. Accordingly, the crank axis 111 is held in the bearing, and the left and right arms 113, 113, and the lever 114 are also held together with the crank axis 111. Namely, since the fixing article 134 is formed integrated with the fixing article extended portion 138, it achieves simultaneously both holding of the crank turning axis 109 and holding of the crank axis 111. Therefore, the assembling is completed by covering fixing article 134 after setting the linked movable article group on the package main body 104 as explained above.

The fixing article 134 is provided with the cover 139 which covers below the movement space of the forcing end 108 side of the lever 110. The cover 139 is formed by swelling a part of the fixing article extended portion 138. Since the forcing end 108 side of the lever 110 is covered by the cover 139, cause of trouble by foreign body which gets in during transportation, storage or using of the package 101 is removed.

It is preferable to constitute the fixing article 134 by processing plate material such as metal plate. Because forming of complex shape such that the hooking article 135, the fixing article extended portion 138, the cover 139 and so on are integrated is achieved easily by press processing. Further, by constituting the fixing article 134 by plate material, together with the level difference 137 is formed on the side plane of the head portion 103, the hooking portion 135 becomes the same plane as the side plane of the head portion 103, projection to width direction disappears.

The fixing article 134 serves as well turning regulating article to the arm 113. As shown in FIG. 7(*b*), the arm 113 is provided with the level difference edge portion 140 having level difference to radial direction from the crank axis 111. When the arm 113 is standing or inclining to front upper direction, since the edge of the arm 113 does not reach to the fixing article 134, turning of the arm 113 is permitted. When the lever 114 is positioned at the front of the head portion 103 and the lock is released, turning of the arm 113 is regulated by intervention of the level difference edge portion 140 to the fixing article 134. Accordingly, hanging down of the lever 114 and the sub-lever 118 below the package main body is prevented. Further, when a plurality of packages 101 are used stacking in multistage, hanging down of the lever 114 and the sub-lever 118 of the upper stage package 101 that obstructs the extraction and insertion of the lower stage package 101 is prevented. Furthermore, in case that the package 101 is a receptacle type optical transmitting and receiving module, when the lever 114 is positioned at the front of the head portion 103, the lever 114 obstructs insertion of an optical fiber connector, and only when the lever 114 is positioned at the upper of the head portion 103, insertion of an optical fiver connector is permitted, insertion of an optical fiber connecter to an unlocked optical transmitting and receiving module is prevented.

In so far, neighbor of head portion of the package 101, specifically lock mechanism is explained by paying attention, surroundings of the package 101 will be explained for supplement. In FIG. 5(*a*), FIG. 6(*a*) and FIG. 7(*a*), numeral 201 denoted the cage, numeral 202 denotes the substrate. The cage 201 is formed to box type having opening at the front end by processing a metal plate. The cage 201 is fixed on the substrate 202 by conventional method. The package 101 is extracted and inserted from the front end of the cage 201. Since the lock mechanism (female side) provided to the cage 201 which receives an optical transmitting and receiving module is based on a standard common to each manufacturer, detailed explanation is not given here.

In addition, the package 101 having lock mechanism in the present invention is applied not only to an optical transmitting and receiving module but also to any other parts (for example, outer memory module, external wireless module and so on) provided to a substrate or an instrument with free of extraction and insertion.

An embodiment that the package 101 is applied to a receptacle type optical transmitting and receiving module will be explained as follows.

As shown in FIG. 8 and FIG. 9, the opening 151 to which optical fiber connector is inserted is provided on the front end of the head portion 103 of the package main body 104. Further, as shown in FIG. 5(a) and FIG. 6(a), the optical element 155 faced with the light transmitting and receiving plane to the opening 151 is provided within the body portion 102 of the package main body 104. The inner substrate 153 is provided at backward of the optical element 155, electric element such as driving circuit, modulating circuit, amplifying circuit, damping circuit, delaying circuit, or so on that is needed to be disposed close to the optical element 155 can be mounted on the inner substrate 155. The connecting terminal group 154 for electric signal is provided at the back end of the body portion 102. The connecting terminal group 154 is formed as a known edge connector (male side), by aligning conductor pattern on the inner substrate 153. On the other hand, processing circuit of electric signal is mounted on the substrate 202. The edge connector (female side) 203 having connecting terminal group of the other side is provided on the substrate 202 in the cage 201. The backward portion of the body portion 102 of the package main body 104 is formed stepwise to avoid the edge connector 203, the connecting terminal group 154 of the inner substrate 153 is projecting to the step portion. When the body portion 102 is inserted to the cage 201, the connecting terminal group 154 is inserted to the edge connecter 203 and contacts with other side connecting terminal group, conduction of electric signal is achieved between the inner substrate 153 and the substrate 202.

A round depressed notch is formed on the front end of the head portion 103 of the package main body 104. This notch is to facilitate to put finger when an optical fiber connector is fitted and removed. Therefore, as shown in FIG. 10(a), the arm 113 and the sub-arm 119 is formed to "<" shape not to protrude from the notch. The lever 114 is positioned at slight backward from the front end of the head portion 103. The two square windows 152 (refer to FIG. 7(a)) led to the opening 151 are provided on the upper plane of the head portion 103 by dividing left and right, and the lever projection 116 is provided at the backward center of the notch between the square windows 152.

As shown in FIG. 10(a), the window 204 is provided at predetermined distance apart from the open end of the bottom plane of the cage 201, this window 204 is a triangular window of which the base 204a is facing with the open end of the cage 201 and the vertex opposite to the base 204a is facing with the back end of the cage 201. As understood by comparing with FIG. 2, the triangular window 204 is same as the conventional. As shown in FIG. 6(a), the package 101 of this invention is determined length and position of the lever 110 to engage the projection 106 exposed to outer of the bottom plane of the body portion 102 with the triangular window 204.

The projection 106 may be constituted by a lump state article which occupies almost all part of the triangular window 204, in this embodiment, as shown in FIG. 10(b), the projection 106 is constituted by two nails 106b, 106c facing respectively with two sides 204b, 204c which are not facing with the open end of the cage 201. Since each nails 106b, 106c is restricted respectively by each side 204b, 204c, position aberration between the projection 106 and the triangular window 204 does not occur. Further, since the nails 106b, 106c are formed by bending a part of the lever 110 by press processing, it is effective to simplify article and simplify manufacturing process.

Among three sides 204a, 204b and 204c of the triangular window 204, only base side 204a become fitting portion opposing to force pulling out the package forward. If the projection 106 is contacting to the base side 204a with sweepback, good fitting effect is not expected. In this respect, since two nails 106b, 106c are facing with two sides 204b, 204c which are not facing with the open end of the cage 201, the front side edge 164 of the nails 106b, 106c contact to the base side 204a. Since edge of the nails 106b, 106c contact with base side 204a without sweepback, the package 101 is locked with good fitting.

As shown in FIG. 10(c), the slope (means inclination to left and right inclination to backward is sweepback) 162 which closes to the center of the triangular window 204 as closer to the vertex 161 of nail 106b, 106c is provided to the nail 106b, 106c. Therefore, when the projection 106 closes to the triangular window 204 by movement of the lever 110, since the vertex 161 of nail 106b, 106c enters to the triangular window 204 at first, then the root of nail 106b, 106c enters, even if position aberration between the projection 106 and the triangular window 204 is occurred, the vertex 161 of nail 106b, 106c does not collide with the side 204b, 204c of the triangular window 204, and the aberration is dissolved because the nail 106b, 106c is guided by the slope 162.

The corner cutting 163 is given to the nail 106b, 106c to lower the height close to the convex opposing to the base side 204a. As shown in FIG. 6(b), since the corner cutting is given, the projection 106 is lowered in its height from the lever 110 close to the backward end of the lever 110. Accordingly, during movement of the lever 110, the projection 106 never rubs each side of the triangular window 204.

FIG. 6(a) and FIG. 10(a) are showing a state that lock is operating. In this locked state, since the package 101 is held thoroughly by the cage 201, an optical fiber connector can be inserted to the opening 151. However, in the state that lock is released as shown in FIG. 5(a) or FIG. 7(a), since the package 101 is not held thoroughly by the cage 201, electric connecting between the connecting terminal group 154 and the edge connector 203 is not assured. If some user begins communication by inserting an optical fiber connector to the opening 151 without being aware of the above, there is the possibility that communicating failure may occur by vibration or shock. Then in the present invention, in the state that lock is released, namely when the lever 114 is positioned in front of the head portion 103, the lever 114 prevents the insertion of an optical fiber connector. Specifically, as explained based on FIG. 7(a) and FIG. 7(b), since the turning of the arm 113 is regulated by intervention of the level difference edge portion 140 of the arm 113 to the fixing article 134, the state that the lever 114 is crossing the front of the opening 151 is given. Further, as shown in FIG. 5(a), and FIG. 5(c), the arm 113 is not extending straightly forward from the crank axis 111, but is slanted to oblique upward by curving "<" shape in the middle. Accordingly, the lever 114 close the front (not lower part) of the opening 151, misinsertion preventing effect is great.

As shown in FIG. 10(a), the opening 151 is two successive opening comprising two openings 151a and 151b that are divided by left, right and center partition. A known two successive optical fiber connector may be inserted to this two successive opening 151. The optical transmitting and receiving module is facing the one opening 151a with the transmitting optical element and facing the other opening 151b with the receiving optical element.

Figure 11:
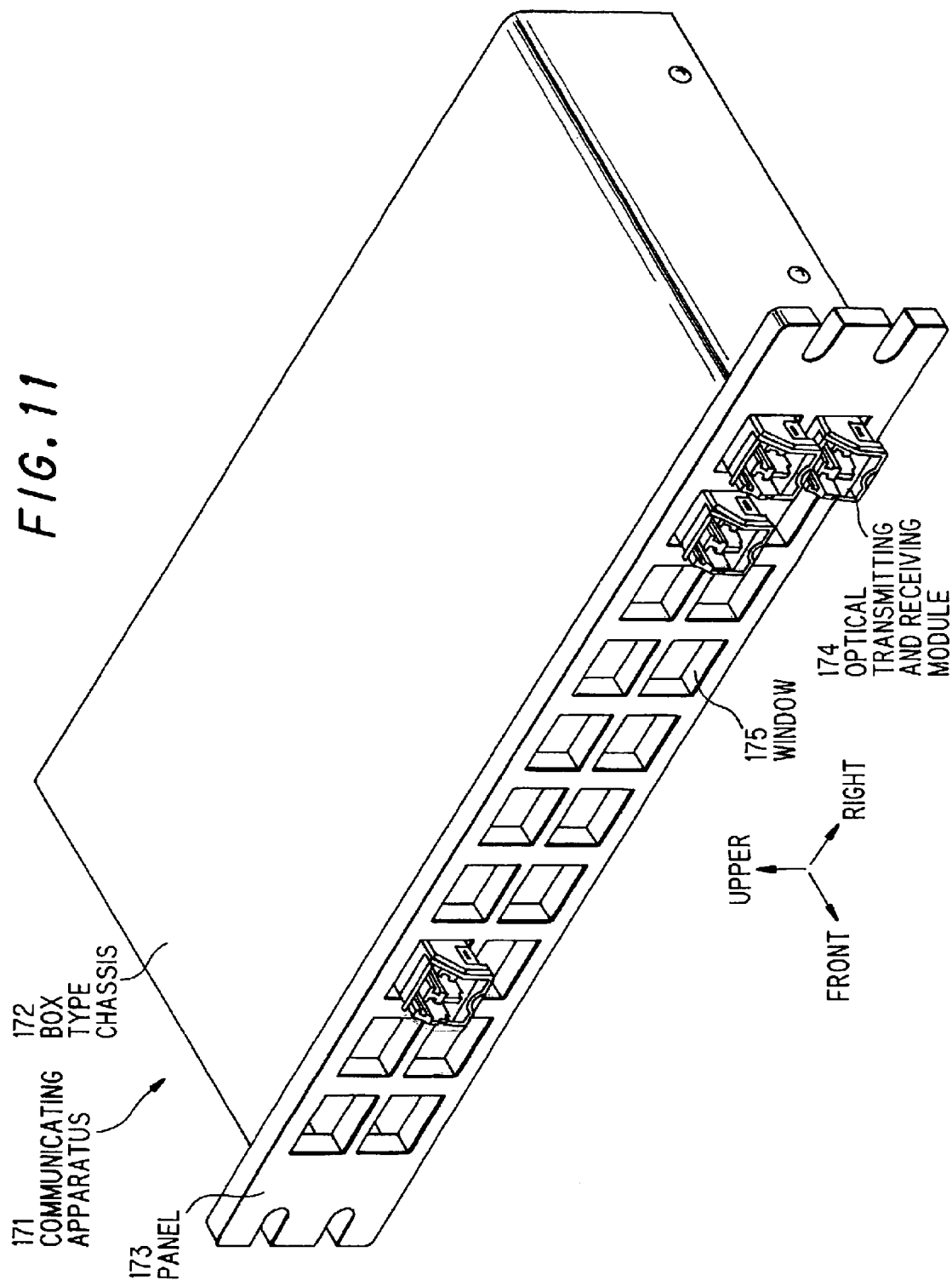
FIG. 11 is a perspective view showing a communication apparatus using the present invention.

Next, a communication apparatus using an optical transmitting and receiving module of the present invention will be explained. As shown in FIG. 11, since the communication apparatus 171 is provided with the panel 173 having flange in front of the box type chassis 172, windows 175 to which the optical transmitting and receiving module 174 is inserted are aligned in multiple lines to vertical and horizontal directions. In the box type chassis 172, as shown in FIG. 12, the substrates 202 to which a plurality of cages 201 are aligned at end potion coinciding position to windows 175 are accommodated by superimposing up and down.

The optical transmitting and receiving module 174 is using the above explained package 101. In the state that the optical transmitting and receiving module 174 is installed correctly in the communicating apparatus, only the head portion 103 is exposing out of the panel 173, and the body portion 102 is inside the box type chassis.

Figure 12:
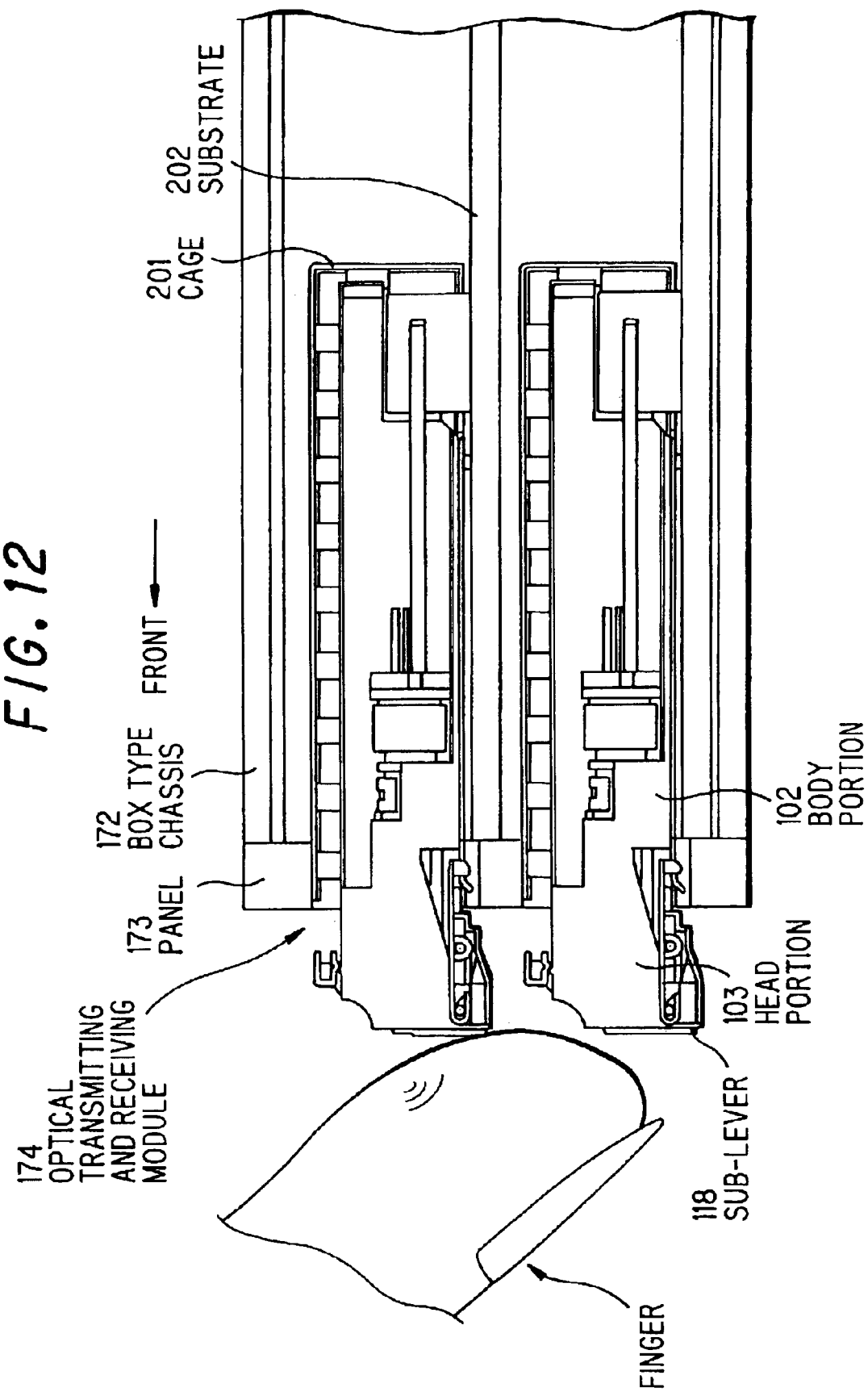
FIG. 12 is a cross sectional view showing a communication apparatus using the present invention.

In the state shown in FIG. 11 and FIG. 12, each optical transmitting and receiving module 174 is locked to the cage 201 in each communication apparatus. Since both the frame comprising the lever 114 and the arm 113, and the frame comprising sub-lever 118 and sub-arm 119 are not interrupting the opening 151, an optical fiber connector can be inserted easily to the opening 151.

In removing the optical transmitting and receiving module 174, eve if the up and low alignment space of the opening 151 is narrow in some degrees, to pull out the lever 114 using fingertip is possible. When the up and low alignment space of the opening 151 is narrower, to raise the sub-arm 119 by touching lightly to the sub-lever with fingertip as shown in FIG. 12 is possible. The subsequent lock releasing procedure has been already explained before. Comparing with the conventional optical transmitting and receiving module (FIG. 4), it is understood that the lock releasing procedure became very easy. And it is understood that narrower the up and low alignment space of the opening 151 in the panel 173, more effective this invention becomes.

Assuming that only the lock is released but the optical transmitting and receiving module is not removed from the state shown in FIG. 12. Then, the optical transmitting and receiving module 174 become a state that the lever 114 is projecting forward (sub-arm 119 returns to the arm 113). Then, intending to insert the optical fiber connector to the opening 151, the lever 114 prevents it. Further, since it is noticeable visually that the lever 114 is falling to forward, an operator may judge easily that the lock is released.

Figure 15:
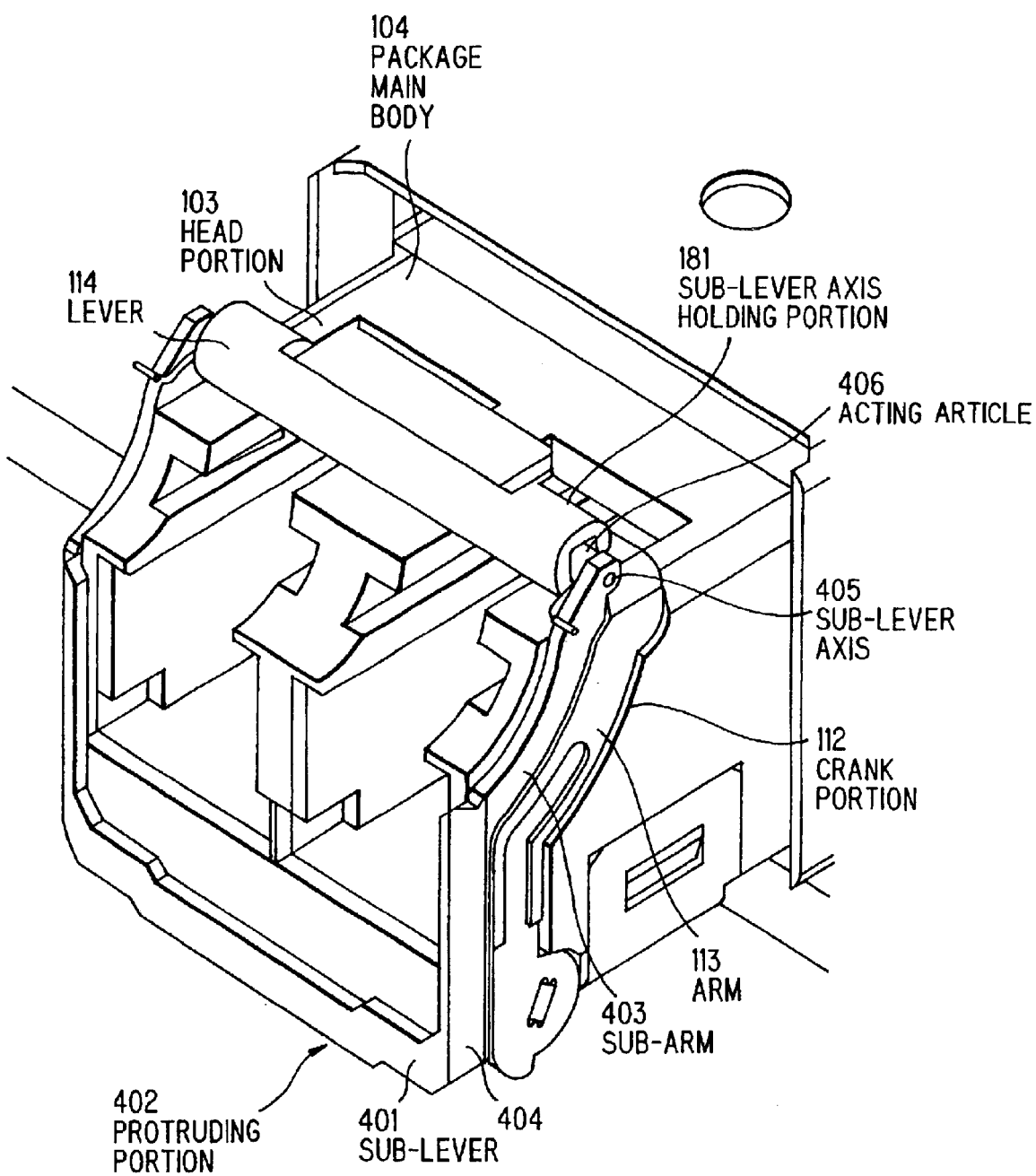
FIG. 15 is an explanatory partial perspective view showing an embodiment of a package having lock mechanism of the present invention.

Next, other embodiment of a sub-lever and a sub-arm are explained. As shown in FIG. 15, the sub-lever 401 is comprised of a plate article facing its plane to the front plane of the head portion 103 of the package main body 104. The sub-lever 401, at least of a part of it is intervening with the front plane of the head portion 103, and a part of it is protruding beneath the bottom plane of the head portion 103. This protruding portion 402 acts as same as the protruding portion 184 of the sub-lever 118 as explained before.

The sub-arm 403 is comprised of a plate article facing its plane to the side plane of the head portion 103 of the package main body 104. Accordingly, the thickness of the sub-arm 403 is absorbed by the level difference as the backward turning stopper 121, protruding to width direction does not exist. The sub-arm 403 is formed to "<" along with the front end edge of the arm 113. However, in the sub-arm 403, the front edge portion 404 which is located forward to the front end of the head portion 103 may be bent to the front plane of the head portion 103 as shown in the Figure.

Sub-lever axis 405 is comprised of a round bar article is inserted and jointed to the sub-arm 403. The sub-lever axis 405 is surrounded and held by the sub-lever axis holding portion 181 which is a pert of the lever 114. Inside the sub-lever axis holding portion 181, the acting article 406 comprising a coil spring is provided.

When external force is not applied, the sub-arm 403 closes to the arm 113 by the operation of the acting article 406. When the sub-lever 401 is pulled to forward, the sub-arm 403 turns with the sub-lever axis 405 center, further the sub-lever 401 is pulled to forward, the lever 114 moves to forward and lock is released.

The sub-lever 401 and the sub-arm 403 are formed together by press processing a plate article. According to this, advantages such as high size accuracy, high productivity, high mechanical strength and no extruding to width direction are obtained comparing with the sub-lever 118 and the sub-arm 119 comprising a series of round bar.

This invention exhibits excellent effects as follows.

(1) Since a projection appears and disappears by turning an arm (first arm), lock is released easily, moreover, an arm can be turned easily by a sub-arm (second arm).
(2) Since an arm and a sub-arm come out front of package, extraction and insertion of a cage are done easily in narrow space.
(3) Since a sub-arm returns closing to an arm by an acting article, a sub-arm is not obstructive.
(4) Since an intervening portion is stopped by striking to front end plane of a package, and extruding portion protrudes beneath front end of package, sub-lever is easy to operate.

Although the invention has been described with respect to specific embodiment and clear disclosure, the appended claims are not to be thus limited but are to be construed as embodying all modification and alternative constructions that may be occurred to one skilled in the art which fairly fall within the basic teaching herein set forth.

What is claimed is:

1. A package having a lock mechanism, comprising:
    a package main body provided with a nearly rectangular shaped body portion and a head portion positioned at a longitudinal front end of said body portion;
    a lever and a lever turning axis provided at a bottom of said head portion, said lever being provided with an acting end including a projection and with a forcing end which is provided at a front end of said head portion and is located at the opposite side of said acting end relative to said lever turning axis, so as to make the projection pass through and not pass through a bottom plane of said body portion;
    a crank axis extending in a width direction of said package main body along the bottom of said head portion, the crank axis being provided with a crank portion that is engaged inside a U-shaped portion of the forcing end of said lever while being surrounded by the U-shaped portion in the forward, up and down directions of the head portion;
    an arm which is integrated with said crank axis and is rotatable along a side plane of said head portion; and
    an arm lever extending from said arm in a width direction of said package main body, wherein when said arm lever is positioned over the head portion, said projection passes through said bottom plane of said body portion, and when said arm lever is positioned in front of said head portion, said projection is accommodated in the bottom plane of said body portion.

2. A package having a lock mechanism according to claim 1, wherein:
a concave portion which is a movement space of said acting end of said lever is provided on a bottom of said body portion.

3. A package having a lock mechanism according to claim 1, wherein:
a lever projection which holds said lever is provided on said head portion.

4. A package having a lock mechanism according to claim 1, wherein:
a forward turning stopper which restricts turning of said arm so as to prevent said lever from moving to a lower location with respect to said head portion is provided.

5. A package having a lock mechanism according to claim 1, wherein:
a backward turning stopper which restricts turning of said arm so as to prevent said lever from moving to a lower location with respect to said head portion is provided.

6. A package having a lock mechanism according to claim 1, wherein:
said arm is provided on each side of said head portion and integrated with said lever.

7. A package having a lock mechanism according to claim 1, wherein:
said arm comprises processed plate material.

8. A package having a lock mechanism according to claim 1, wherein:
a convex swelling is formed smoothly faced with said head portion on said arm.

9. A package having lock a mechanism according to claim 1, wherein:
a bearing is provided at a bottom of said head portion, and a lever crank axis is inserted to into said bearing from below.

10. A package having a lock mechanism according to claim 1, wherein:
the package is configured such that a forcing end of said lever is fixed to said crank portion by folding back said crank portion.

11. A package having a lock mechanism according to claim 1, wherein:
said head portion is provided with a fixing article which fixes said lever together with said lever turning axis by pressing them to a bottom of said head portion, said fixing article is provided with!hook portion along both sides of said head portion, and both sides of said head portion are provided with a fixing article projection which engages to said hook portion.

12. A package having a lock mechanism according to claim 11, wherein:
said fixing article is provided with a cover which covers, from below, a movement space of said forcing end side of said lever.

13. A package having a lock mechanism according to claim 12, wherein:
said fixing article comprises processed plate material.

14. A package having a lock mechanism according to claim 11, wherein:
a level difference edge portion having a level difference to a radial direction from said crank axis is provided on said arm, and wherein the package is adapted so that the turning of said arm is regulated by intervention of said level difference edge portion to said fixing article.

15. A package having a lock mechanism according to claim 1, wherein:
an opening to which an optical fiber connector is inserted is provided on a front end of said head portion, an optical element faced with said opening is provided within said body portion, a connecting terminal group of said optical element for an electric signal is provided at a back end of said body portion, and said body portion is inserted to into a box cage front end an opening in the box case at its front end and provided on a substrate mounted with an electrical signal processing circuit.

16. A package having a lock mechanism according to claim 15, wherein:
a window is provide at a predetermined distance apart from said open end of a bottom of said cage, said window is a triangular window of which base is facing said open end of said cage and vertex is facing a back end of said cage, and length and position of said lever is configured to engage a projection exposed past the outer of a bottom surface of said body portion with said triangular window.

17. A package having a lock mechanism according to claim 16, wherein:
said projection comprises two nails facing respectively with two different sides of said triangular window.

18. A package having a lock mechanism according to claim 17, wherein:
said nail has a slope which closes to a center of said triangular window as closer to a vertex of said nail.

19. A package having a lock mechanism according to claim 15, wherein:
said lever is adapted to prevent insertion of an optical fiber connector when said lever is positioned in front of said head portion.

20. A package having a lock mechanism according to claim 15, wherein:
said opening comprises two successive openings to which two successive optical connectors are inserted, and wherein a transmitting optical element is faced with one opening and a receiving optical element is faced with an other opening.

21. A package having a lock mechanism, comprising:
a package provided with an opening at a front end of the package;
a lever provided at a tip with a projection which alternately passes through and does not pass through a bottom plane of said package;
a crank axis provided with a crank portion to which a rear end of said lever is connected;
a first arm connected to said crank axis and rotatable around said crank axis;
a second arm provided at a free end of said first arm and foldable toward said first arm, the second arm having a similar shape to the first arm; and
a sub-lever provided at a free end of said second arm.

22. A package having a lock mechanism according to claim 21, wherein:
an acting article which returns a free end of said second arm toward said first arm is provided between said second arm and said first arm.

23. A package having a lock mechanism according to claim 21, wherein:

said acting article is comprised of a coil spring.

24. A package having a lock mechanism according to claim 21, wherein:

a free end of said second arm is positioned near a lower hem of a face plane of said package.

25. A package having a lock mechanism according to claim 21, wherein:

said sub-lever is provided with an intervening portion which intervenes with a face end of said package and a protruding portion which protrudes below the face end of said package.

26. A package having a lock mechanism according to claim 21, wherein:

a free end of said first arm adapted to be positioned above said openings of said package.

27. A package having a lock mechanism, comprising:

a package provided with an opening at a front end of the package;

a lever provided at its tip with a projection which alternately passes through and does not pass through a bottom plane of said package;

a crank axis provided with a crank portion to which a rear end of said lever is connected;

an arm connected to said crank axis and rotatable around said crank axis; and an arm lever provided to at a free end of said arm; wherein said arm lever is provided with a foldable joint portion between said crank axis and said free end of said arm such that said arm has a sub-arm that extends from the foldable joint portion to said free end, and the sub-arm has a similar shape to a remaining portion of said arm and is foldable toward the remaining portion of said arm.

* * * * *